United States Patent
Takatsu et al.

(10) Patent No.: US 9,264,167 B2
(45) Date of Patent: Feb. 16, 2016

(54) OPTICAL ADD DROP MULTIPLEXER

(75) Inventors: Kazuo Takatsu, Kawasaki (JP); Koji Takeguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 13/053,766

(22) Filed: Mar. 22, 2011

(65) Prior Publication Data
US 2012/0002964 A1 Jan. 5, 2012

(30) Foreign Application Priority Data

Jun. 30, 2010 (JP) ................................ 2010-149296

(51) Int. Cl.
H04J 14/00 (2006.01)
H04J 14/02 (2006.01)

(52) U.S. Cl.
CPC ........... *H04J 14/0212* (2013.01); *H04J 14/021* (2013.01); *H04J 14/0204* (2013.01); *H04J 14/0205* (2013.01); *H04J 14/0209* (2013.01)

(58) Field of Classification Search
None
See application file for complete search history.

(56) References Cited

U.S. PATENT DOCUMENTS

| | | | | |
|---|---|---|---|---|
| 5,107,360 A | * | 4/1992 | Huber | 398/91 |
| 5,408,351 A | * | 4/1995 | Huang | 398/191 |
| 6,351,323 B1 | | 2/2002 | Onaka et al. | |
| 6,748,150 B1 | * | 6/2004 | Dutta et al. | 385/123 |
| 2003/0138252 A1 | * | 7/2003 | Paiam et al. | 398/49 |
| 2005/0271314 A1 | | 12/2005 | Noguchi et al. | |
| 2009/0154923 A1 | | 6/2009 | Kwon et al. | |
| 2009/0232497 A1 | * | 9/2009 | Archambault et al. | 398/50 |
| 2010/0150558 A1 | | 6/2010 | Wisseman | |
| 2011/0038636 A1 | | 2/2011 | Akiyama et al. | |

FOREIGN PATENT DOCUMENTS

| | | |
|---|---|---|
| JP | 11-289296 | 10/1999 |
| JP | 2005-348270 | 12/2005 |
| JP | 2006-87062 | 3/2006 |
| JP | 2009-145869 | 7/2009 |
| JP | 2009-206707 | 9/2009 |
| WO | 2009/152860 A1 | 12/2009 |

OTHER PUBLICATIONS

Extended European Search Report mailed Feb. 1, 2013 for corresponding European Application No. 11158983.4.
(Continued)

*Primary Examiner* — Darren E Wolf
(74) *Attorney, Agent, or Firm* — Staas & Halsey LLP

(57) ABSTRACT

An optical add-drop multiplexer having first and second routes includes: an optical cross connect; a first multiplexer optically coupled to a plurality of output ports of the optical cross connect; a second multiplexer optically coupled to a plurality of other output ports of the optical cross connect; a first wavelength selective switch to generate a first WDM optical signal including an optical signal output from the first multiplexer and to guide the first WDM optical signal to the first route; and a second wavelength selective switch to generate a second WDM optical signal including optical signal output from the second multiplexer and to guide the second WDM optical signal to the second route.

14 Claims, 30 Drawing Sheets

(56) References Cited

OTHER PUBLICATIONS

Philip N. Ji et al., "Colorless and Directionless Multi-Degree Reconfigurable Optical Add/Drop Multiplexers", Wireless and Optical Communications Conference (WOCC), 2010 19$^{th}$ Annual, IEEE, May 14, 2010, pp. 1-5, XP031709492, ISBN: 978-1-4244-7597-1.
Japanese Office Action mailed Jan. 28, 2014 in corresponding Japanese Application No. 2010-149296.

* cited by examiner

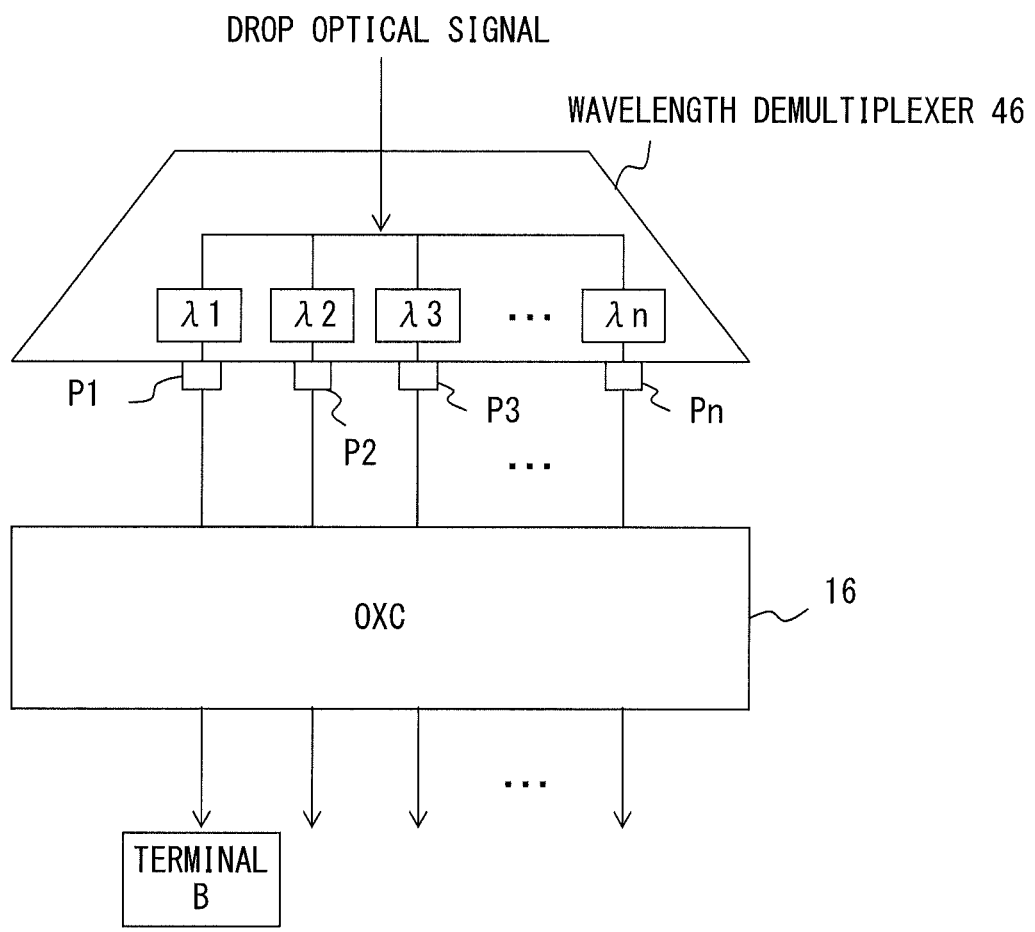
F I G. 8

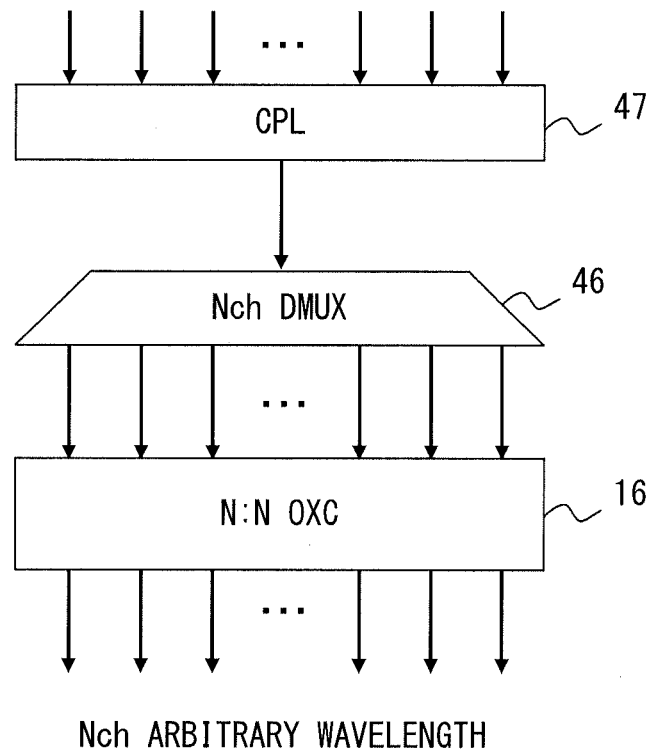
F I G. 9

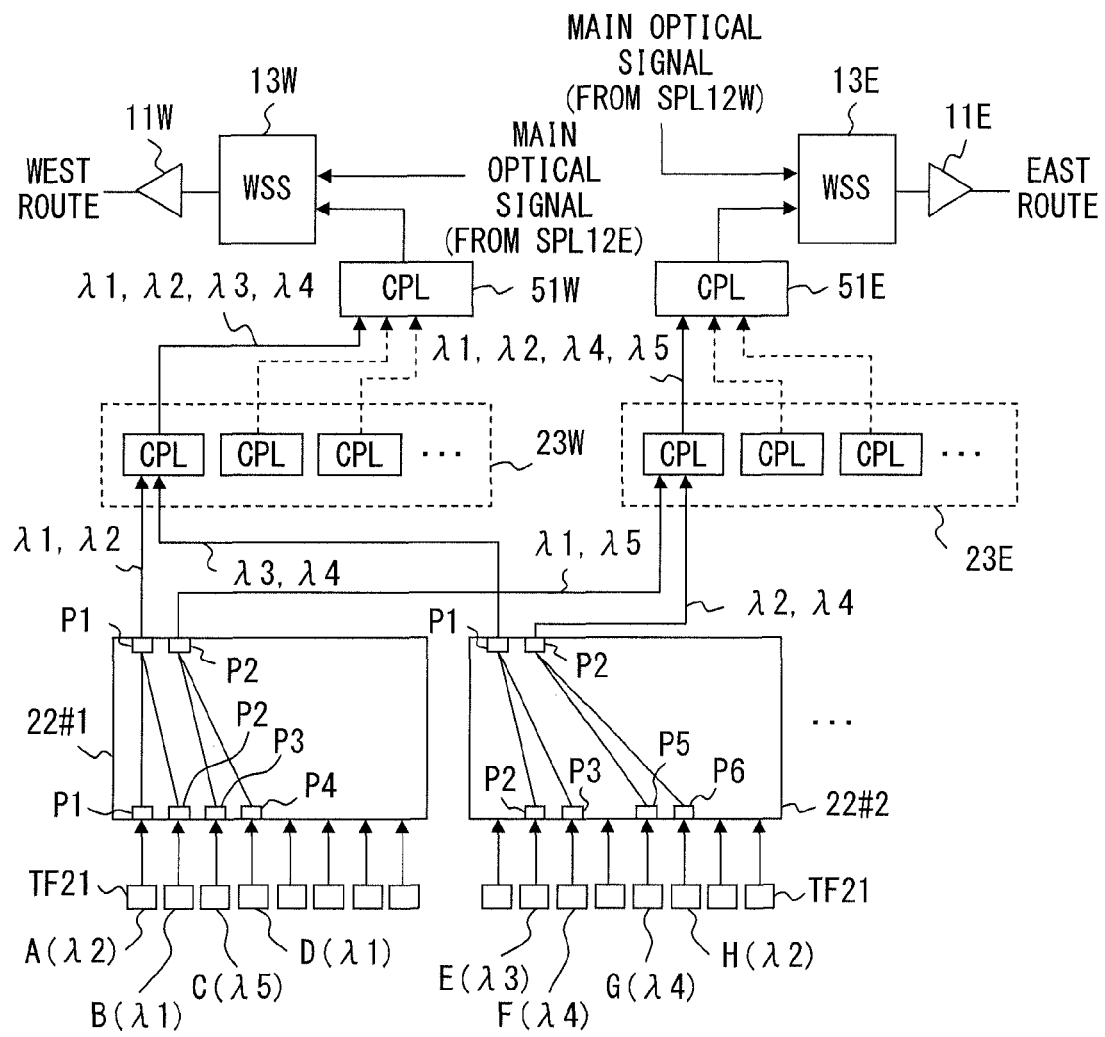
F I G. 1 3

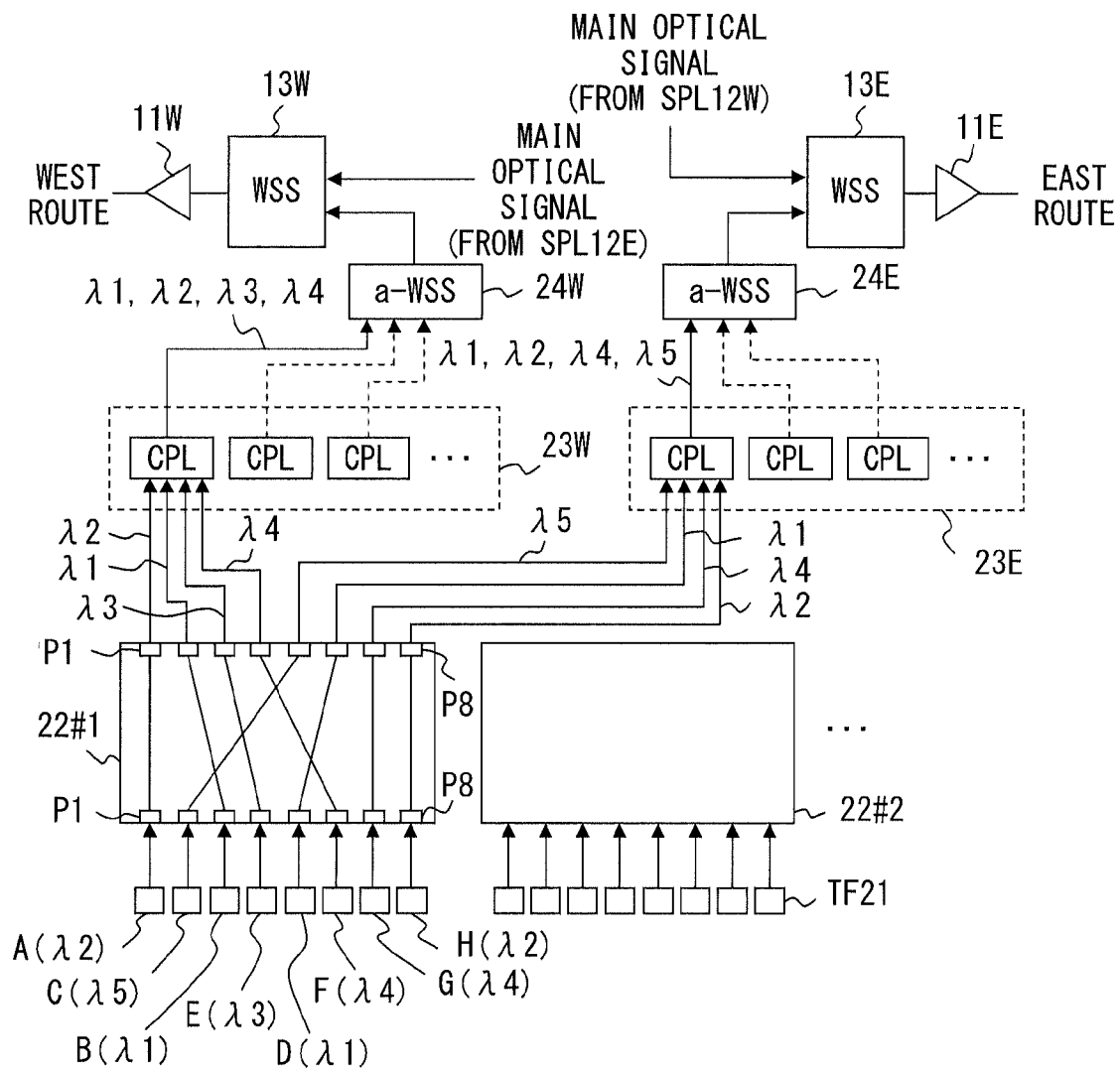
F I G. 14

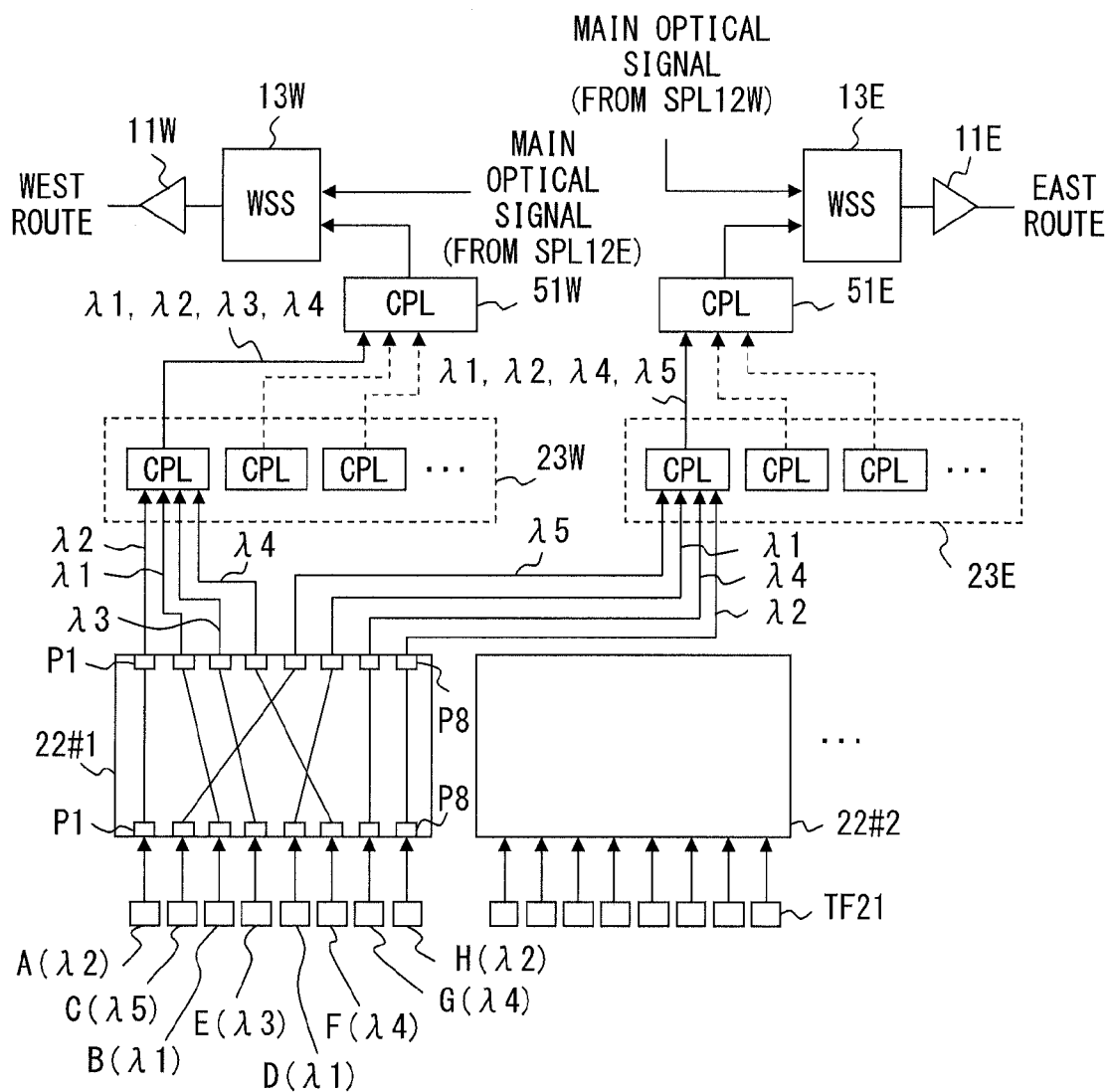
F I G. 15

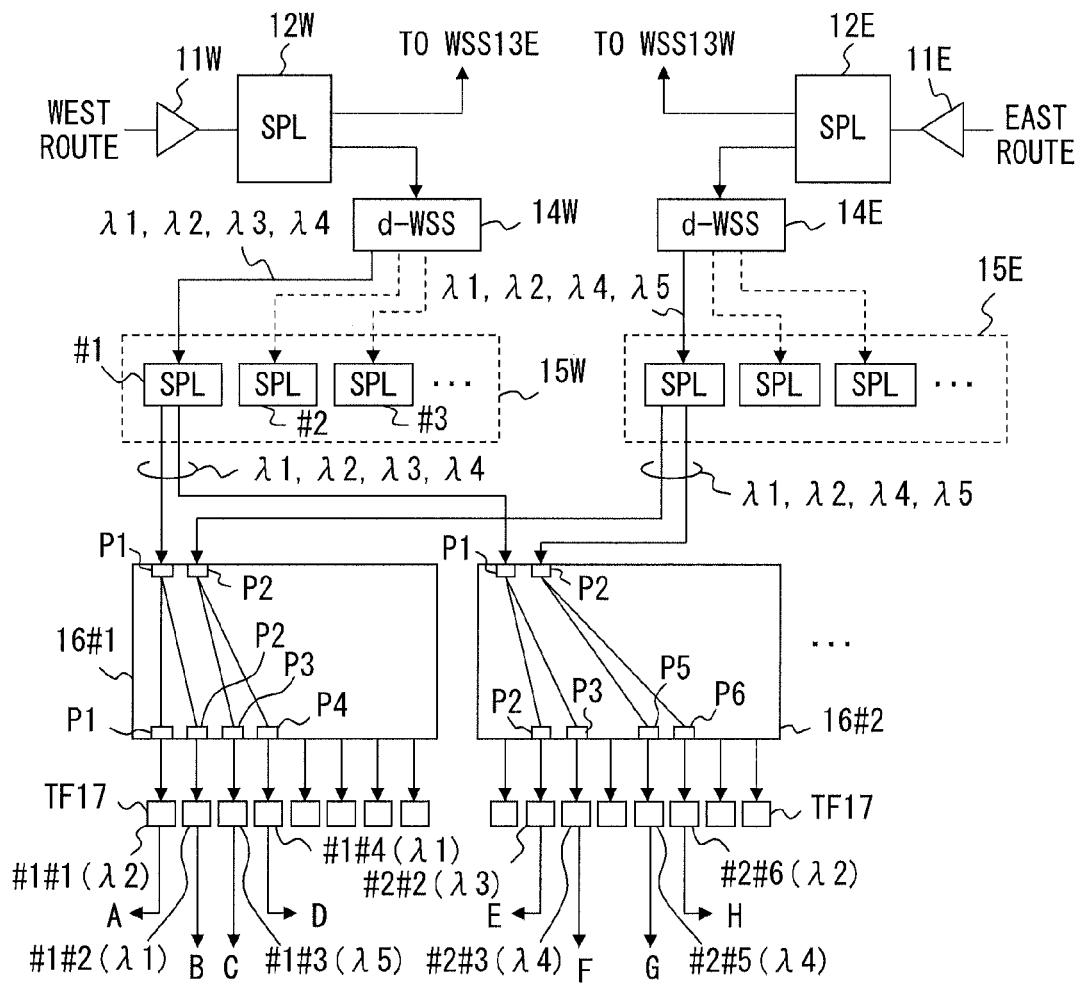
F I G. 17

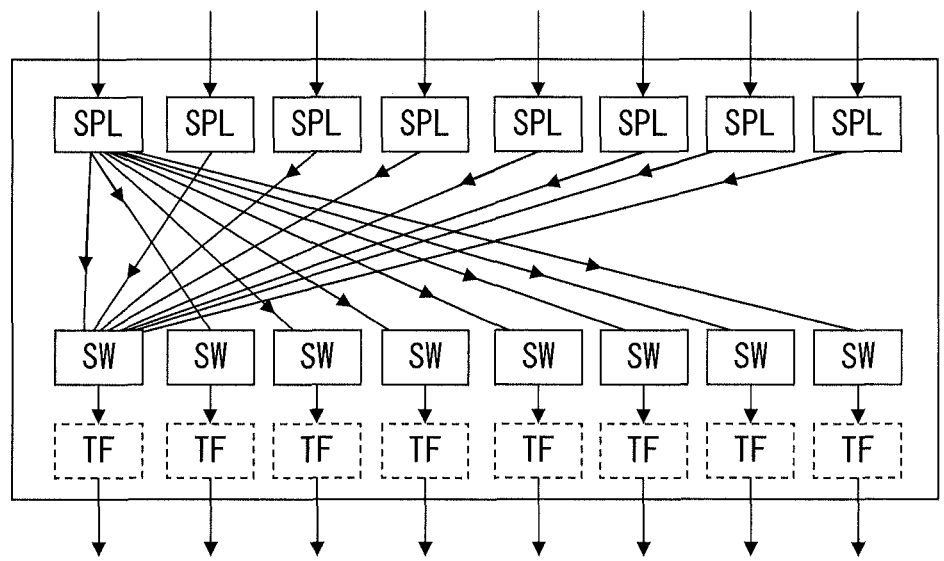
F I G. 1 8

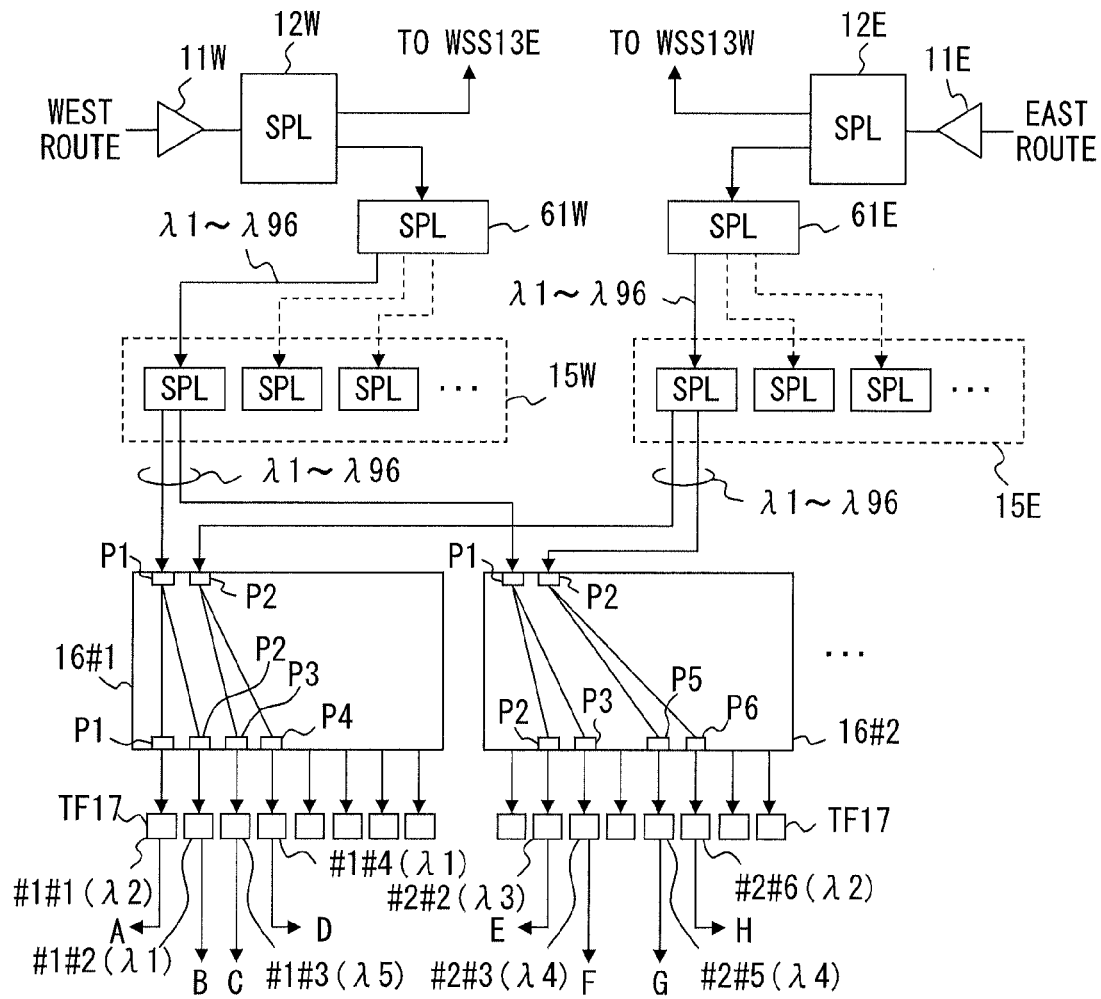
F I G. 19

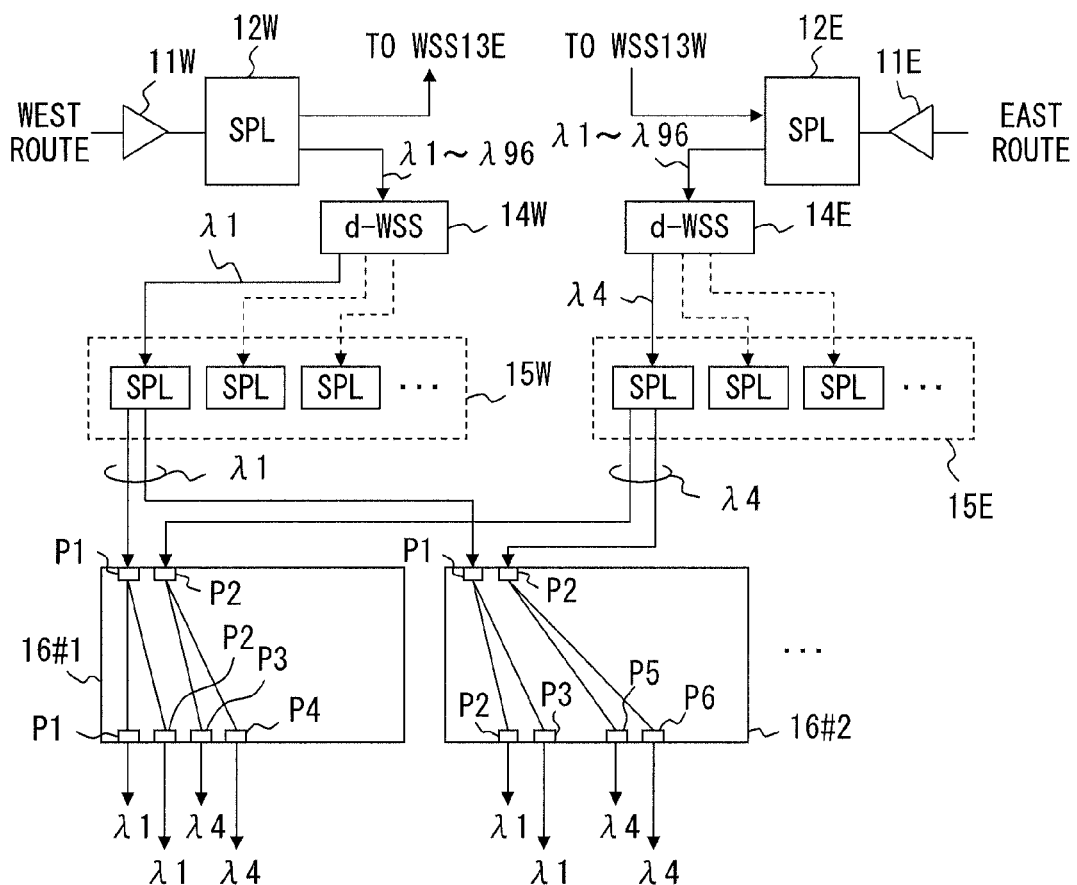
F I G. 2 3

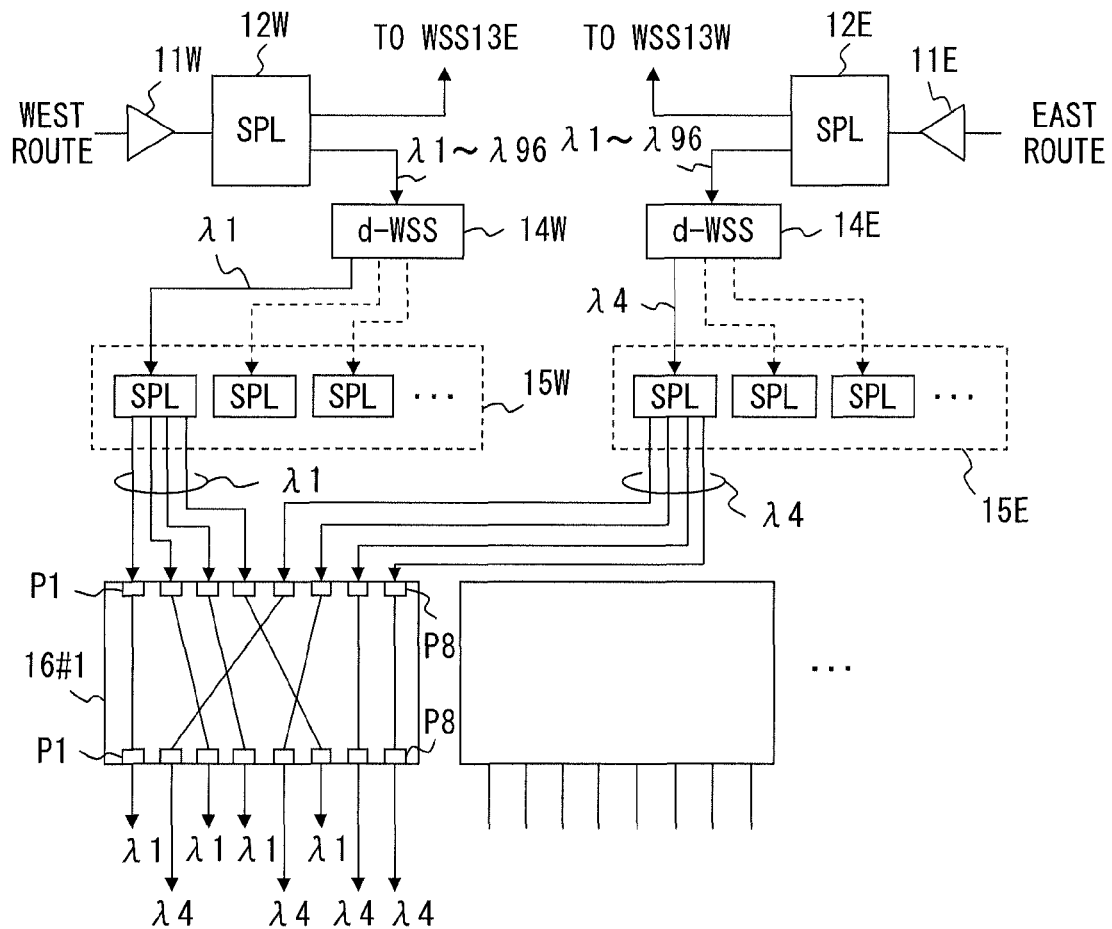
F I G. 2 4

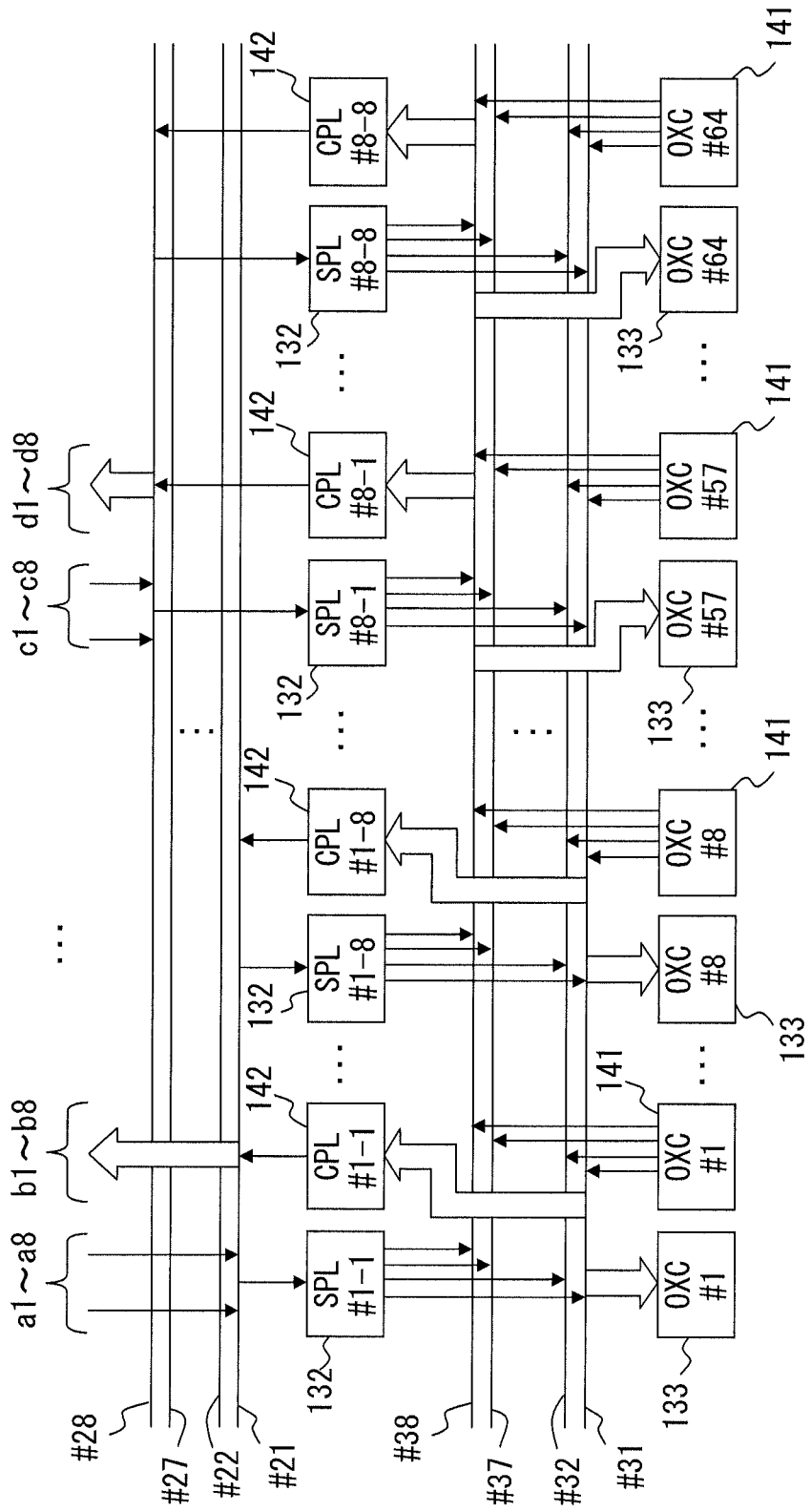
F I G. 30

OPTICAL ADD DROP MULTIPLEXER

CROSS-REFERENCE TO RELATED APPLICATION

This application is based upon and claims the benefit of priority of the prior Japanese Patent Application No. 2010-149296, filed on Jun. 30, 2010, the entire contents of which are incorporated herein by reference.

FIELD

The embodiments discussed herein are related to an optical add-drop multiplexer used in a WDM system.

BACKGROUND

As amounts of information on networks increase, the WDM (Wavelength Division Multiplexing) system is gaining popularity. The WDM multiplexes and transmits a plurality of optical signals using a plurality of wavelengths. For this reason, in the WDM system, the transmission capacity increases as the number of multiplexed wavelengths increases.

In the WDM system, all or some of optical nodes have an OADM (Optical Add-Drop Multiplexer). An optical add-drop multiplexer can insert an optical signal into an optical transmission path with respect to wavelength and branch an optical signal from the optical transmission path with respect to wavelength. In other words, an optical add-drop multiplexer has an optical add device (or, an optical add function) to add an optical signal of a desired wavelength to a WDM optical signal, and an optical drop device (or, an optical drop function) to drop an optical signal of a desired wavelength from a WDM optical signal. Meanwhile, an optical add-drop multiplexer that adds and/or drops an optical signal of a desired wavelength is sometimes called an ROADM (Reconfigurable OADM).

As a related art, an optical transmission apparatus described below has been proposed. An optical transmission apparatus has at least two variable wavelength selective filters including a first variable wavelength selective filter that performs drop/add operations for some signals among optical signals to be dropped/added, and a second variable wavelength selective filter that performs drop/add operations for optical signals that are not selected by the first variable wavelength selective filter among the optical signals to be dropped/added (for example, Japanese Laid-open Patent Publication No. H11-289296).

As another related art, an optical add-drop multiplexer described below has been proposed. An optical add-drop multiplexer uses a droptype AOTF (Acousto-Optic Tunable Filter) as a configuration to remove an optical signal of the same wavelength as the wavelength of an added optical signal from a "through" signal. In the drop type AOTF, RF signals are input so that all wavelengths are constantly selected, and only for the wavelength to be rejected, corresponding RF signal is stopped. Accordingly, an optical signal of the wavelength for which corresponding RF signal is stopped is not selected by the drop type AOTF, and the optical signal does not pass through (for example, Japanese Laid-open Patent Publication No. 2005-348270).

As yet another related art, an ROADM terminal apparatus that adds and drops an optical signal of a given wavelength component has been proposed. The ROADM terminal apparatus has an optical switching unit for transmitting and receiving a given wavelength component of an optical signal to/from another ROADM terminal apparatus, an OSC control information generation unit that generates OSC (Optical Supervisor Channel) control information to drop/add an optical signal, and an OSC control information input/output I/F for transmitting and receiving the OSC control information to/from another ROADM terminal apparatus (for example, Japanese Laid-open Patent Publication No. 2009-206707).

As yet another related art, a wavelength selective switch that may perform add/drop functions for all input channels and has a high degree of freedom has been proposed. The wavelength selective switch includes an optical demultiplexing unit that divides an input optical signal with respect to wavelength corresponding to each channel, and selects and outputs an optical signal divided from the input optical signal or an optical signal input through an additional port, an optical deflecting unit that deflects an optical signal of each channel received from the optical demultiplexing unit individually by current supply or voltage application, and an optical multiplexing unit that outputs the optical signal for each channel to a specific output port by the deflection by the optical deflecting unit (for example, Japanese Laid-open Patent Publication No. 2009-145869).

It is preferable that an optical add-drop multiplexer has a configuration with which the wavelength path may be set or changed flexibly. For example, it is preferable that an optical add-drop multiplexer is Colorless, Directionless and Contentionless.

"Colorless" indicates a configuration or function with which a desired wavelength may be input to a desired port of the optical add-drop multiplexer, and a desired wavelength may be output from a desired port. "Directionless" indicates a configuration or function with which, in a configuration in which the optical add-drop multiplexer has a plurality of incoming/outgoing routes, an optical signal from a terminal may be guided to a desired outgoing route, and an optical signal from each incoming route may be guided to a desired terminal. "Contentionless" indicates a configuration or function to avoid contention between optical signals of the same wavelength within the optical add-drop multiplexer.

However, in a conventional optical add-drop multiplexer, it is difficult to set up or change a wavelength path flexibly. That is, in a conventional optical add-drop multiplexer, it is difficult to set up a desired wavelength path. For example, in a conventional optical add-drop multiplexer, when switching from a state to output an optical signal transmitted from a terminal to a first outgoing route into a state to output the optical signal to a second outgoing route, it is required to change an input port to which the optical fiber from the terminal is connected.

SUMMARY

According to an aspect of an invention, an optical add-drop multiplexer having first and second routes includes: an optical cross connect; a first multiplexer optically coupled to a plurality of output ports of the optical cross connect; a second multiplexer optically coupled to a plurality of other output ports of the optical cross connect; a first wavelength selective switch to generate a first WDM optical signal including an optical signal output from the first multiplexer and to guide the first WDM optical signal to the first route; and a second wavelength selective switch to generate a second WDM optical signal including an optical signal output from the second multiplexer and to guide the second WDM optical signal to the second route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7-FIG. 10 are diagrams illustrating a configuration to realize a drop function.

FIG. 13 is a diagram presenting the second example of the add operation.

FIG. 14 is a diagram presenting the third example of the add operation.

FIG. 15 is a diagram presenting the fourth example of the add operation.

FIG. 17 is a diagram presenting the first example of a drop operation.

FIG. 18 is a diagram presenting the configuration of an optical cross connect used in the drop operation.

FIG. 19 is a diagram presenting the second example of the drop operation.

FIG. 23 is a diagram presenting the sixth example of the drop operation.

FIG. 24 is a diagram presenting the seventh example of the drop operation.

FIG. 30 is a diagram presenting the fourth example of an 8-Degree optical add-drop multiplexer.

DESCRIPTION OF EMBODIMENTS

Figure 1A:
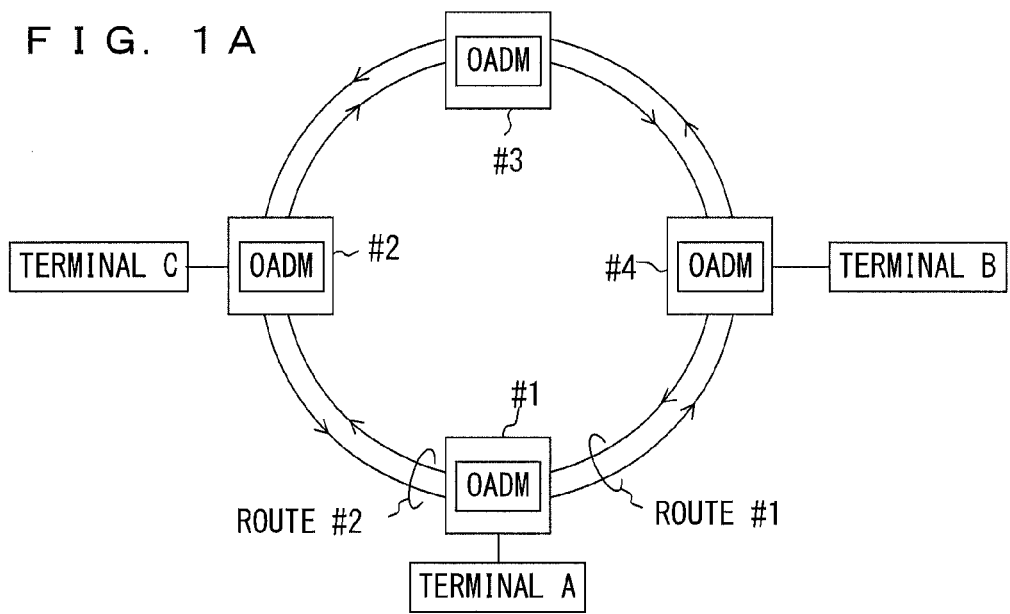
FIG. 1A and FIG. 1B are diagrams presenting a network system in which an optical add-drop multiplexer of the embodiment is used.
Figure 1B:
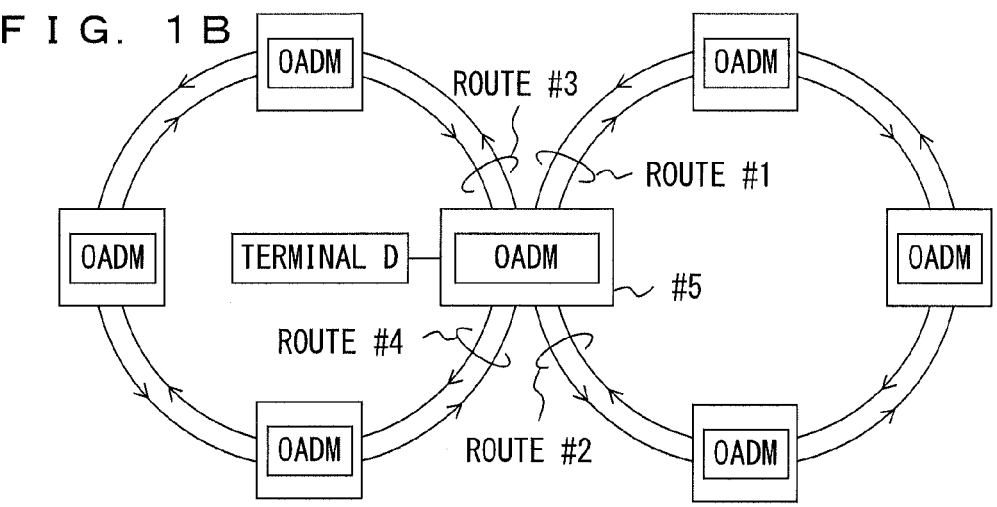

FIG. 1A and FIG. 1B are diagrams presenting the configuration of a network system in which an optical add-drop multiplexer of the embodiment is used. The optical add-drop multiplexer (OADM) is provide in an optical node. In addition, the optical add-drop multiplexer has a function to add an optical signal of a desired wavelength or optical signals of a plurality of desired wavelengths to a WDM optical signal, and a function to drop an optical signal of a desired wavelength or optical signals of a plurality of desired wavelengths from a WDM optical signal.

The network system presented in FIG. 1A is a bidirectional ring network, which has four of optical nodes #1-#4. The respective nodes are optically connected by a pair of a clockwise optical transmission path and a counter-clockwise optical transmission path. The clockwise optical transmission path and the counter-clockwise optical transmission path respectively transmit a WDM optical signal. The optical nodes #1-#4 respectively have an optical add-drop multiplexer.

For each of the optical nodes or each of the optical add-drop multiplexers, an optical transmission path extending in a given direction is referred to as a "route". For example, the optical node #1 (or the optical add-drop multiplexer of the optical node #1) has a route #1 and a route #2. The route #1 is optically coupled to the optical node #4. In the route #1, an optical transmission path to transmit a WDM optical signal from the optical node #4 to the optical node #1 (an incoming route or ingress route), and an optical transmission path to transmit a WDM optical signal from the optical node #1 to the optical node #4 (an outgoing route or egress route) are provided. Meanwhile, the route #2 is optically coupled to the optical node #2. In the route #2, an optical transmission path to transmit a WDM optical signal from the optical node #2 to the optical node #1 (an incoming route or ingress route), and an optical transmission path to transmit a WDM optical signal from the optical node #1 to the optical node #2 (an outgoing route or egress route) are provided.

In the network system configured as described above, for example, when transmitting data from the terminal A to the terminal B, the optical node #1 outputs an optical signal transmitted from the terminal A to the route #1. At this time, the terminal A transmits, for example, an optical signal carrying data using wavelength $\lambda 1$. Then, the optical add-drop multiplexer of the optical node #1 adds the optical signal transmitted from the terminal A to a WDM optical signal transmitted from the optical node #2 to the optical node #4. The optical add-drop multiplexer of the optical node #4 drops an optical signal of the wavelength $\lambda 1$ from the WDM optical signal and guides the dropped optical signal to the terminal B. Accordingly, the data transmitted from the terminal A is received by the terminal B.

When transmitting data from the terminal C to the terminal A, the terminal C transmits, for example, an optical signal carrying data using wavelength $\lambda 2$. Then, the optical add-drop multiplexer of the optical node #2 adds an optical signal transmitted from the terminal C to a WDM optical signal transmitted from the optical node #3 to the optical node #1. The WDM optical signal is input from the route #2 to the optical node #1. The optical add-drop multiplexer of the optical node #1 drops an optical signal of the wavelength $\lambda 2$ from the WDM optical signal and guides the dropped optical signal to the terminal A. Accordingly, the data transmitted from the terminal C is received by the terminal A.

In the network system presented in FIG. 1A, each optical add-drop multiplexer has two routes. However, the optical add-drop multiplexer of the embodiment may be configured to have more routes. For example, in the network system presented in FIG. 1B, the optical add-drop multiplexer of an optical node #5 has four routes #1-#4. At this time, the optical add-drop multiplexer of the optical node #5 is able to output an optical signal of a given wavelength transmitted from the terminal D to a desired route. In addition, the optical add-drop multiplexer of the optical node #5 is able to drop an optical signal of a given wavelength from a given route and forward the dropped optical signal to the terminal D.

The number of routes that an optical add-drop transmitter has may be counted with "Degree". For example, as each of the optical add-drop multiplexers presented in FIG. 1A has two routes, they may be referred to as "2-degree". In addition, as the optical add-drop multiplexer of the optical node #5 presented in FIG. 1B has four routes, it may be referred to as "4-degree".

Figure 2:
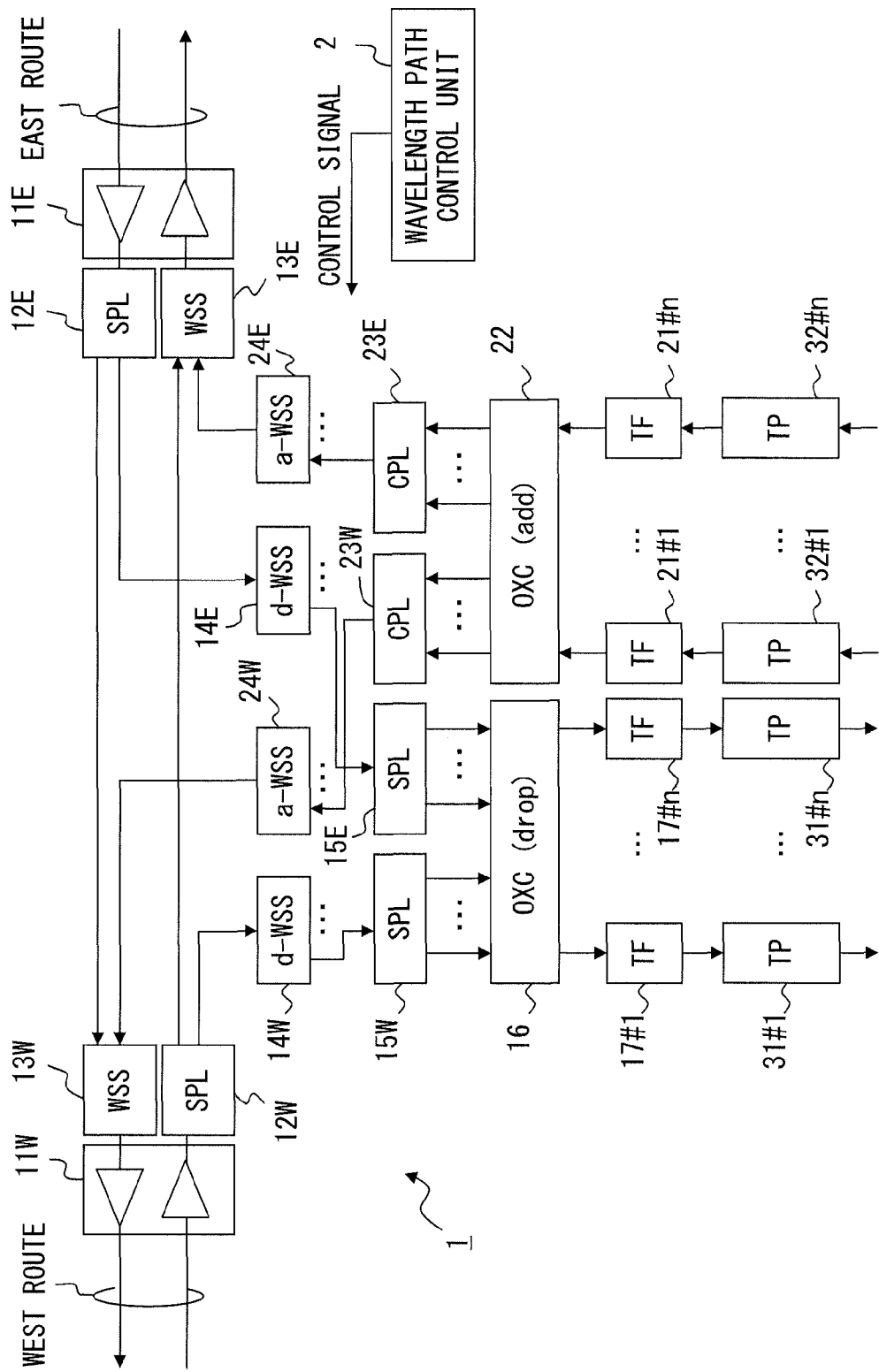
FIG. 2 is a diagram presenting the configuration of an optical add-drop multiplexer of the embodiment.

FIG. 2 is a diagram presenting the configuration of an optical add-drop multiplexer 1 of the embodiment. In the example presented in FIG. 2, the optical add-drop multiplexer 1 has two routes (an EAST route and a WEST route). The EAST route has a pair of an incoming route and an outgoing route. In the same manner, the WEST route has a pair of an incoming route and an outgoing route.

An optical amplifier 11E amplifies a WDM optical signal input from the EAST route, and amplifies a WDM optical signal output to the EAST route. In the same manner, an optical amplifier 11W amplifies a WDM optical signal input from the WEST route, and amplifies a WDM optical signal output to the WEST route. The gain of the optical amplifiers 11E, 11W may be calculated in advance, or may be controlled dynamically.

An optical splitter (SPL) 12E splits a WDM optical signal input from the EAST route and guides the WDM optical signal to a wavelength selective switch (WSS) 13W and a drop-wavelength selective switch (d-WSS) 14E. In the same manner, an optical splitter (SPL) 12W splits a WDM optical signal input from the WEST route and guides the WDM optical signal to a wavelength selective switch (WSS) 13E and a drop-wavelength selective switch (d-WSS) 14W. The split ratio of the optical splitters 12E and 12W are, for example, designed according to the configuration of the optical add-drop multiplexer 1. The wavelength selective switches (13E, 13W, 14E, 14W) may have a function to equalize output levels of the respective selected optical signals.

The drop-wavelength selective switch 14E selects one or more optical signal(s) of a wavelength(s) specified by a wavelength path control unit 2 from a WDM optical signal guided from the optical splitter 12E. In the same manner, the drop-wavelength selective switch 14W selects one or more optical signal(s) of a wavelength(s) specified by the wavelength path control unit 2 from a WDM optical signal guided from the optical splitter 12W. The wavelength(s) selected by the drop-wavelength selective switch 14E and the wavelength(s) selected by the drop-wavelength selective switch 14W may be different from each other, may be the same, or may be partly overlapped with each other.

An optical splitter (SPL) 15E splits an optical signal selected by the drop-wavelength selective switch 14E. In the same manner, an optical splitter (SPL) 15W splits an optical signal selected by the drop-wavelength selective switch 14W.

An optical cross connect (OXC) 16 has N input ports and N output ports. To each of m1 input ports among the N input ports, an optical signal obtained by the optical splitter 15E is input. In this case, the same optical signal with each other is input to m1 input ports. In the same manner, each of other m2 input pots among the N input ports, an optical signal obtained by the optical splitter 15W is input. In this case, the same optical signal with each other is input to m2 input ports. The optical cross connect 16 guides each input optical signal to an output port specified respectively by the wavelength path control unit 2. The optical cross connect may be an all-optical cross connect that performs cross connect entirely optically without performing photoelectric conversion.

Tunable filters (TF) 17#1-17#n respectively perform filtering for an optical signal output from a corresponding output port of the optical cross connect 16. Here, each of the tunable filters 17#1-17#n removes wavelength components other than the specified wavelength. The transmission (or passing) wavelengths of the tunable filters 17#1-17#n are different from each other, while this is not a particular limitation. For example, the transmission wavelengths of the tunable filters 17#1, 17#n are assumed as $\lambda 1$, $\lambda n$, respectively. At this time, when a WDM optical signal including $\lambda 1$-$\lambda 5$ is input to the tunable filter 17#1, an optical signal of $\lambda 1$ is extracted. Meanwhile, when a WDM optical signal including $\lambda 1$-$\lambda 5$ is input to the tunable filter 17#n, an optical signal of $\lambda 5$ is extracted.

However, the tunable filters 17#1-17#n may include transmission wavelengths that overlap with each other. In addition, the transmission wavelengths of the tunable filters 17#1-17#n may be specified by the wavelength path control unit 2.

Transponders (TP) 31#1-31#n respectively forward an optical signal output from corresponding tunable filters 17#1-17#n to a corresponding terminal. At this time, the transponders 31#1-31#n convert the wavelength of the optical signal as needed. Meanwhile, the wavelengths of the optical signals output from the transponders 31#1-31#n may be the same or may be different from each other.

The transponders (TP) 32#1-32#n respectively transfer optical signals transmitted from corresponding terminals to corresponding tunable filters 21#1-21#n. At this time, the transponders 32#1-32#n convert the wavelength of the optical signal as needed. Meanwhile, the wavelengths of the optical signals transmitted from the respective terminals may be the same or may be different from each other. In addition, the wavelengths of the optical signals output from the transponders 32#1-32#n may be different from each other, while this is not a particular limitation.

Tunable filters (TF) 21#1-21#n perform filtering for optical signals output from corresponding transponders 32#1-32#n. Here, the tunable filters 21#1-21#n remove wavelength components other than the specified wavelength. The transmission wavelengths of the tunable filters 21#1-21#n may be different from each other.

However, the tunable filters 21#1-21#n may include transmission wavelengths that overlap with each other. In addition, the transmission wavelengths of the tunable filters 21#1-21#n may be specified by the wavelength path control unit 2.

An optical cross connect (OXC) 22 has N input ports and N output ports. To the N input ports of the optical cross connect 22, optical signals for which filtered by the tunable filters 21#1-21#n are input. The optical cross connect 22 guides each input signal to an output port specified respectively by the wavelength path control unit 2.

An optical coupler (CPL) 23E combines (or joins) optical signals output from output ports of the optical cross connect 22. Meanwhile, an optical coupler 23W combines optical signals output from other output ports of the optical cross connect 22.

An add-wavelength selective switch (a-WSS) 24E selects one or more optical signal(s) of a wavelength(s) specified by the wavelength path control unit 2 from optical signals guided from the optical coupler 23E. In the same manner, add-wavelength selective switch (a-WSS) 24W selects one or more optical signal(s) of a wavelength(s) specified by the wavelength path control unit 2 from optical signals guided from the optical coupler 23W. The wavelength(s) selected by the add-wavelength selective switch 24E and the wavelength(s) selected by the add-wavelength selective switch 24W may be different from each other, may be the same, or may be partly overlapped with each other.

The wavelength selective switch 13E generates a WDM optical signal output to the EAST route from an optical signal guided through the optical splitter 12W from the WEST route and an optical signal guided from the add-wavelength selective switch 24E, according to the control by the wavelength path control unit 2. At this time, the wavelength selective switch 13E selects specified one or plurality of wavelengths that "passes through" the optical add-drop multiplexer 1 from the optical signal guided through the optical splitter 12W from the WEST route. In addition, the wavelength selective switch 13E selects specified one or plurality of wavelengths to "add" to the WDM optical signal from the optical signal guided from the add-wavelength selective switch 24E.

In the same manner, the wavelength selective switch 13W generates a WDM optical signal output to the WEST route from an optical signal guided through the optical splitter 12E from the EAST route and an optical signal guided from the add-wavelength selective switch 24W, according to the control by the wavelength path control unit 2. At this time, the wavelength selective switch 13W selects specified one or plurality of wavelengths that "passes through" the optical add-drop multiplexer 1 from the optical signal guided through the optical splitter 12E from the WEST route. In addition, the wavelength selective switch 13W selects specified one or plurality of wavelengths to "add" to the WDM optical signal from the optical signal guided from the add-wavelength selective switch 24W.

The wavelength path control unit 2 instructs the wavelengths that the wavelength selective switches 13E, 13W, drop-wavelength selective switches 14E, 14W, add-wavelength selective switches 24E, 24W select, according to the order from the user or the network administrator. In addition, the wavelength path control unit 2 controls the switching of the optical cross connects 16, 22 according to the order from the user or the network administrator. Furthermore, the wavelength path control unit 2 controls the transmission wavelengths of the tunable filters 17#1-17#n, 22#-1-21#n.

The wavelength path control unit 2 has, for example, a processor and a memory. The memory may be configured to store a program describing the add operation and the drop operation of the optical add-drop multiplexer 1. In this case, the processor provides the add operation and the drop operation for an optical signal by executing the program stored in the memory. In addition, the wavelength path control unit 2 may provide an interface with the user or the network administrator.

In the optical add-drop multiplexer 1 configured as described above, the optical splitter 12E and the drop-wavelength selective switch 14E operate as a drop signal generator to generate a drop optical signal from a WDM optical signal input from the EAST route. In the same manner, the optical splitter 12W and the drop-wavelength selective switch 14W operate as a drop signal generator to generate a drop optical signal from a WDM optical signal input from the WEST route. Meanwhile, the drop signal generator does not necessarily need to have the drop-wavelength selective switches 14E, 14W. In addition, the drop signal generator may be realized by another configuration.

In the example presented in FIG. 2, the optical add-drop multiplexer 1 has two routes (the EAST route and the WEST route), but there is no particular limitation for the number of the routes that the optical add-drop multiplexer has. That is, the optical add-drop multiplexer 1 may be configured to have more routes. In addition, in the example presented in FIG. 2, the optical add-drop multiplexer 1 has one optical cross connect OXC (drop) 16 and one optical cross connect OXC (add) 22, but there is no particular limitation for the number of optical cross connects that the optical add-drop multiplexer has. That is, the optical add-drop multiplexer 1 may have a plurality of optical cross connects for drop operation and a plurality of optical cross connects for add operation. The number of optical cross connects that the optical add-drop multiplexer 1 has is designed, for example, according to the number of ports of each optical cross connect and the number of channels of the transponders.

Figure 3A:
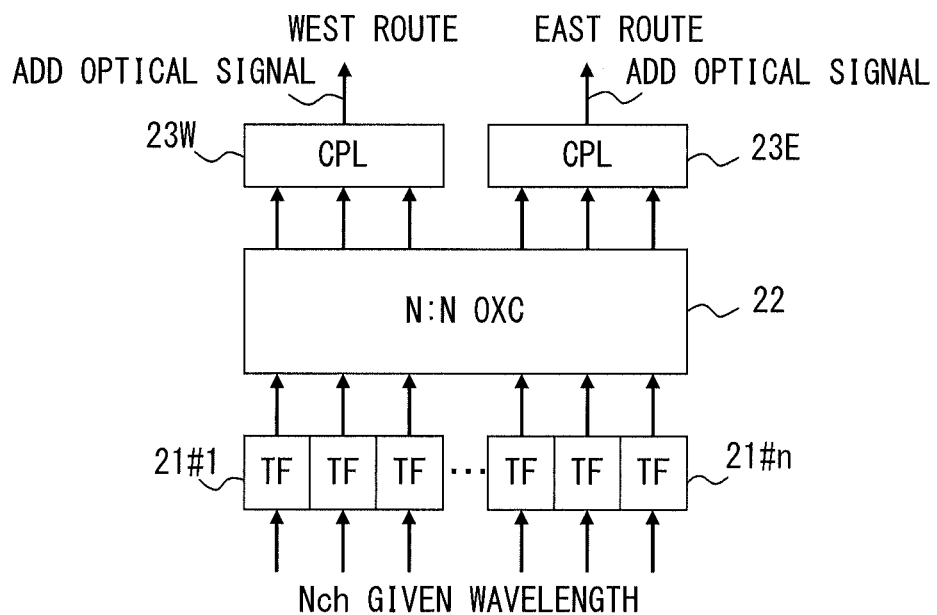
FIG. 3A-FIG. 3C are diagrams illustrating a configuration to realize an add function.
Figure 3B:
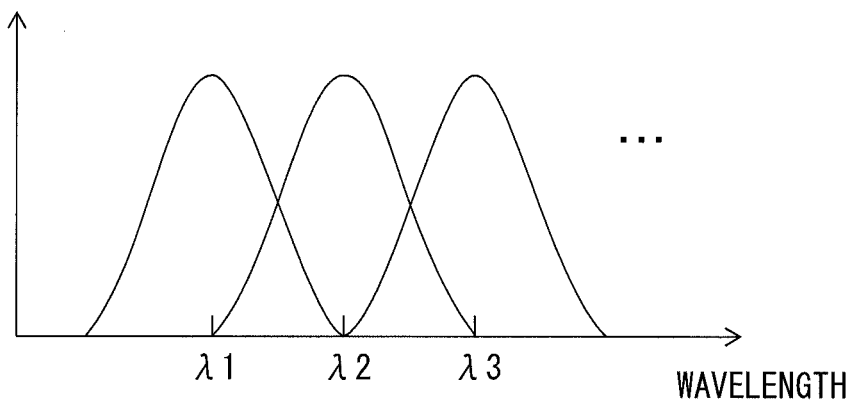
Figure 3C:
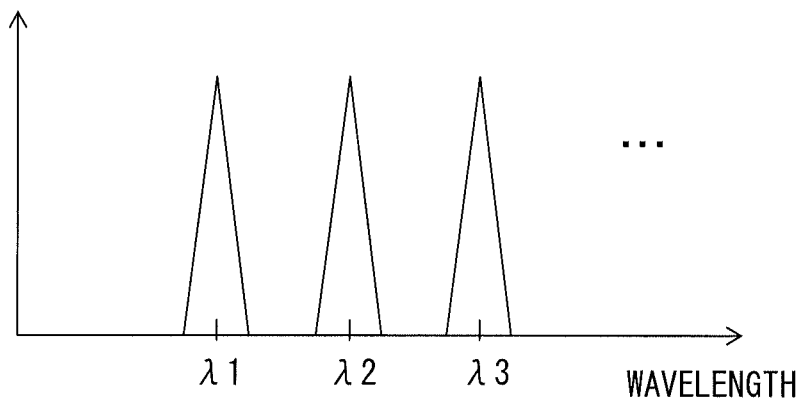

FIG. 3A-FIG. 3C are diagrams illustrating the configuration to realize the add function of the optical add-drop multiplexer 1. In FIG. 3A, tunable filters 21#1-21#n are optically coupled to the input ports of the optical cross connect 22. In this example, the transmission wavelengths of the tunable filters 21#1-21#n are $\lambda_1$-$\lambda_n$, respectively.

In the configuration described above, the optical cross connect 22 may guide an optical signal of each input port to a desired output port. For example, when an instruction to output an optical signal of the wavelength $\lambda_1$ to the EAST route is given, the optical cross connect 22 guides an optical signal input through the tunable filter 21#1 to the optical coupler 23E. At this time, the optical cross connect 22 guides the optical signal to arbitrary one of the plurality of output ports optically coupled to the optical coupler 23E. The optical coupler 23E combines the optical signal of the wavelength $\lambda_1$ and an optical signal on other wavelength to generate add optical signal. Then, the add optical signal output from the optical coupler 23E is selected by the add-wavelength selective switch 24E and the wavelength selective switch 13E presented in FIG. 2, and added to a WDM optical signal to be output to the EAST route.

Meanwhile, when an instruction to output an optical signal of the wavelength $\lambda_1$ to the WEST route is given, the optical cross connect 22 guides an optical signal input through the tunable filter 21#1 to the optical coupler 23W. At this time, the optical cross connect 22 guides the optical signal to arbitrary one of the plurality of output ports optically coupled to the optical coupler 23W. The optical coupler 23W combines the optical signal of the wavelength $\lambda_1$ and an optical signal on other wavelength to generate add optical signal. Then, the add optical signal output from the optical coupler 23W is selected by the add-wavelength selective switch 24W and the wavelength selective switch 13W presented in FIG. 2, and added to a WDM optical signal to be output to the WEST route.

Thus, in the optical add-drop multiplexer 1, an optical signal of the wavelength 21 can be output to a desired route, by appropriately controlling the operations of the optical cross connect 22, the add-wavelength selective switches 24E, 24W, and the wavelengths selective switches 13E, 13W. That is, in the optical add-drop multiplexer 1, when switching the outgoing route to which the optical signal of the wavelengths $\lambda_1$ is output, there is no need to change the connection of the optical fibers between the optical devices. Therefore, "Directionless" is realized.

In addition, in the optical add-drop multiplexer 1, for example, when a plurality of optical signals of different wavelengths are output to the EAST route, the plurality of optical signals are guided to the optical coupler 23E by the optical cross connect 22. Then, the optical coupler 23E combines the plurality of optical signals and guides them to the EAST route. Here, the input ports of the optical coupler do not have wavelength dependency. That is, each of the optical couplers 23E, 23W is not in the configuration in which "to each of the input ports, an optical signal of a specific wavelength that is respectively determined in advance must be input". Therefore, when a plurality of optical signals of different wavelengths are guided to the optical couplers 23E, 23W, the optical signals may be input to arbitrary input ports respectively. That is, according to this configuration, "Colorless" is realized.

However, the spectrum width of an optical signal transmitted from a terminal or a transponder is not necessarily narrow.

For example, when a terminal or a transponder uses an inexpensive laser as a signal light source, the spectrum width of an optical signal is wide. When the spectrum width of each optical signal is wide, as presented in FIG. 3B, the spectra of optical signals of adjacent wavelengths may overlap with each other. In this case, when a plurality of optical signals are combined using an optical coupler, interference may occur between the optical signals.

Therefore, the optical add-drop multiplexer 1 has the tunable filters 21#1-21#n to narrow the spectrum width of each optical signal. It is assumed that the respective passing wavelength widths of the tunable filters 21#1-21#n are sufficiently narrow. Then, the spectra of optical signals output from the tunable filters 21#1-21#n do not overlap with each other as presented in FIG. 3C. Therefore, even when a plurality of optical signals are combined using the optical coupler, interference between optical signals are prevented or suppressed.

Thus, the optical add-drop multiplexer 1 of the embodiment has an optical coupler for each route. In the examples presented in FIG. 2 and FIG. 3A, two optical couplers (23E, 23W) are provided for two routes (the EAST route, the WEST route).

Figure 4:
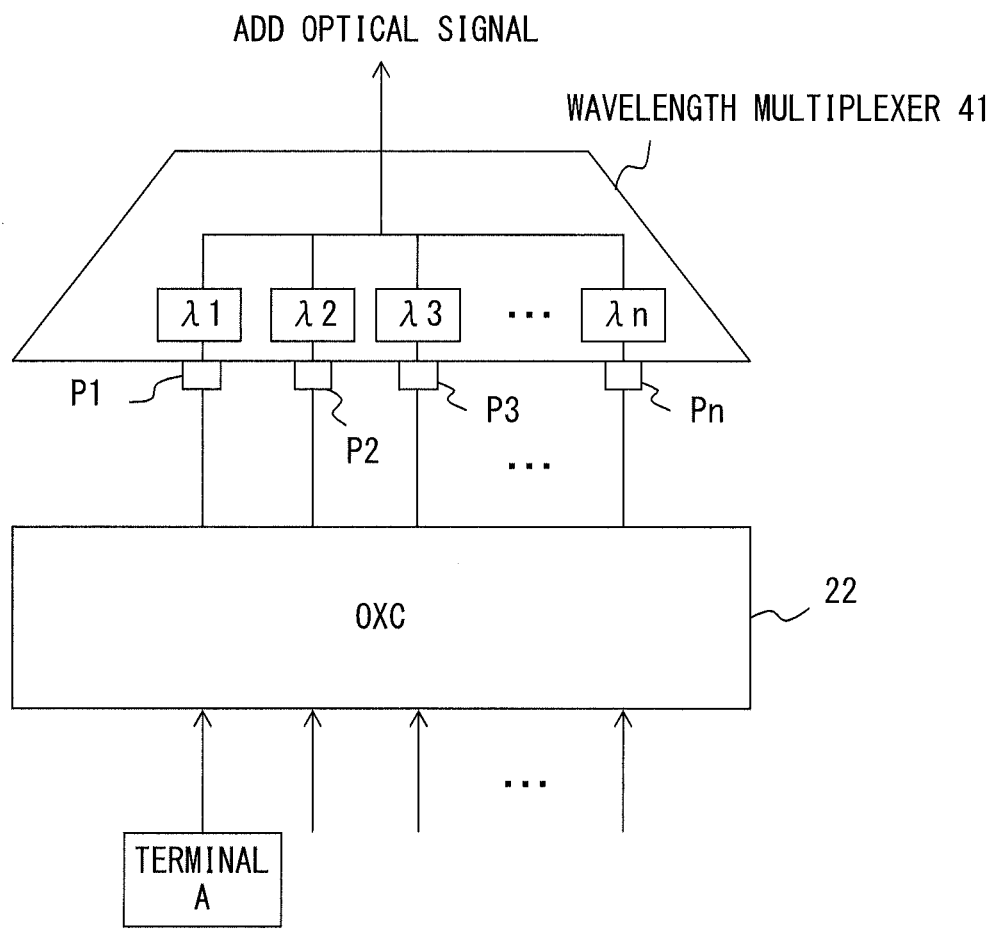
FIG. 4-FIG. 6 are diagrams illustrating another configuration to realize the add function.

FIG. 4 is a diagram illustrating another configuration to realize the add function of the optical add-drop multiplexer 1. In the example presented tin FIG. 2, a plurality of optical signals output from the optical cross connect 22 are combined by the optical couplers (23E, 23W). That is, the optical coupler is used as a multiplexer to combine a plurality of optical signals. However, the multiplexer to multiplex a plurality of optical signals may be realized by another method. That is, the multiplexer to multiplex a plurality of optical signals may be realized by a wavelength multiplexer 41 presented in FIG. 4, for example.

The wave length multiplexer 41 has optical filters that respectively have different transmission wavelengths, for the respective input ports. In the example presented in FIG. 4, the transmission wavelengths of optical filters provided for input ports P1, P2, P3, Pn are $\lambda 1, \lambda 2, \lambda 3 \ldots, \lambda n$, respectively. In this case, for example, an optical signal of the wavelength $\lambda 1$ must be input to the input port P1, and an optical signal of the wavelength $\lambda 2$ must be input to the input port P2. Thus, the input ports of the wavelength multiplexer 41 have wavelength dependency.

However, in the configuration presented in FIG. 4, the optical cross connect 22 is provided on the input side of the wavelength multiplexer 41. Then, for example, when an optical signal of the wavelength $\lambda 1$ is transmitted from a terminal (or, a transponder) A, the optical cross connect 22 guides the optical signal to the input port P1 of the wavelength multiplexer 41. Meanwhile, when an optical signal of the wavelength $\lambda 3$ is transmitted from the terminal A, the optical cross connect 22 guides the optical signal to the input port P3 of the wavelength multiplexer 41. That is, according to this configuration, even when the wavelength of an optical signal transmitted from a terminal (or, a transponder) changes, the optical signal is guided to an appropriate input port of the wavelength multiplexer 41. Therefore, this configuration also realizes "Colorless".

Meanwhile, while only one wavelength multiplexer 41 is depicted in the example presented in FIG. 4, in order to realize the configuration presented in FIG. 2, two wavelength multiplexers corresponding to the optical couplers 23E, 23W may be provided. That is, the wavelength multiplexer 41 presented in FIG. 4 may be provided for each route that the optical add-drop multiplexer has. In addition, in the configuration presented in FIG. 4, since optical filters ($\lambda 1$-$\lambda n$) are provided within the wavelength multiplexer 41, the tunable filters 21#1-21#n presented in FIG. 2 do not have to be provided.

Figure 5:
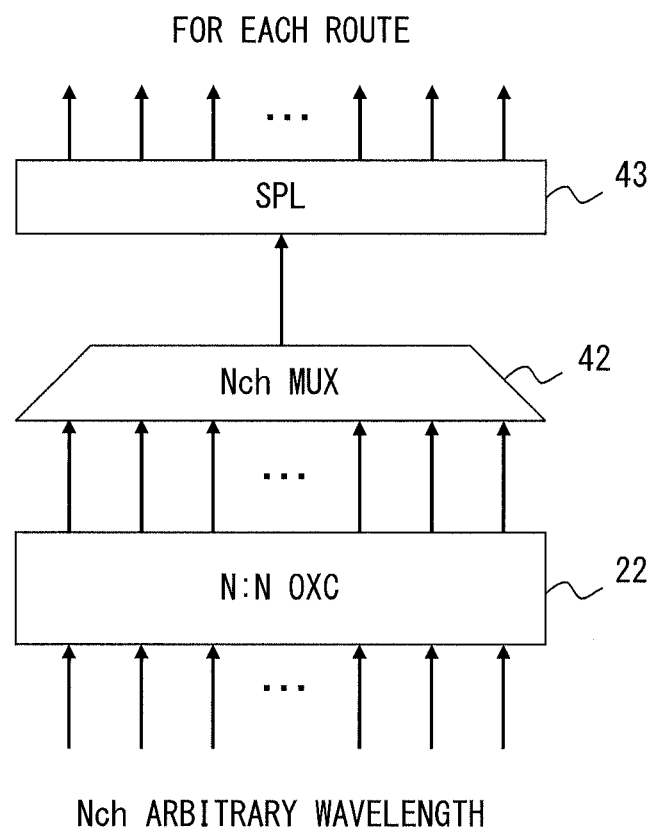

FIG. 5 is a diagram illustrating yet another configuration to realize the add function of the optical add-drop multiplexer 1. In the example presented in FIG. 2, on the output side of the optical cross connect 22, an optical coupler is provided for each route. That is, the optical coupler 23E is provided for the EAST route, and the optical coupler 23W is provided for the WEST route. In contrast, in the configuration presented in FIG. 5, one multiplexer 42 is provided for a plurality of routes. Here, the multiplexer 42 corresponds to the optical couplers (23E, 23W) or a wavelength multiplexer (41) that multiplexes a plurality of optical signals.

In the configuration presented in FIG. 5, an optical signal output from the multiplexer 42 is split by an optical splitter (SPL) 43 and guided to each route. For example, when the configuration presented in FIG. 5 is applied to the optical add-drop multiplexer 1 illustrated in FIG. 2, the optical splitter 43 splits an output optical signal of the multiplexer 42 and guides it to the add-wavelength selective switches 24E, 24W. In this case, the add-wavelength selective switch 24E selects a wavelength of the optical signal to be output to the EAST route, and the add-wavelength selective switch 24W selects a wavelength of the optical signal to be output to the WEST route. According to the configuration, there is no need to provide the multiplexer 42 (in the example, an optical coupler or a wavelength multiplexer) for each route.

Figure 6:
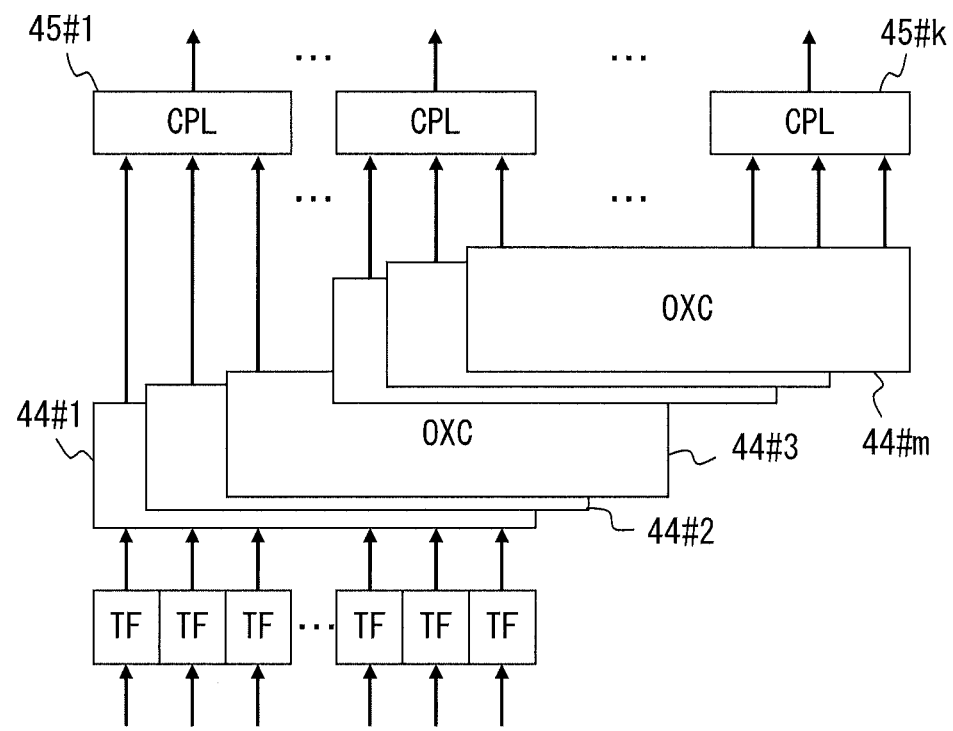

FIG. 6 is a diagram illustrating yet another configuration to realize the add function of the optical add-drop multiplexer 1. The optical cross connect 22 presented in FIG. 2 is realized, in the configuration presented in FIG. 6, by a plurality of optical cross connects 44#1-44#m. Optical couplers (CPL) 45#1-45#k are provided for each route in the same manner as in the configuration presented in FIG. 2. To each of the optical couplers 45#1-45#k, one or more optical signals output from the respective optical cross connects 44#1-44#m are guided. As an example, to the optical coupler 45#1, optical signals output from the first input port of each of the optical cross connects 44#1-44#m are guided. In addition, to the optical couplers 45#k, optical signals output from the k-th output port of each of the optical cross connects 44#1-44#m are guided.

Figure 7:
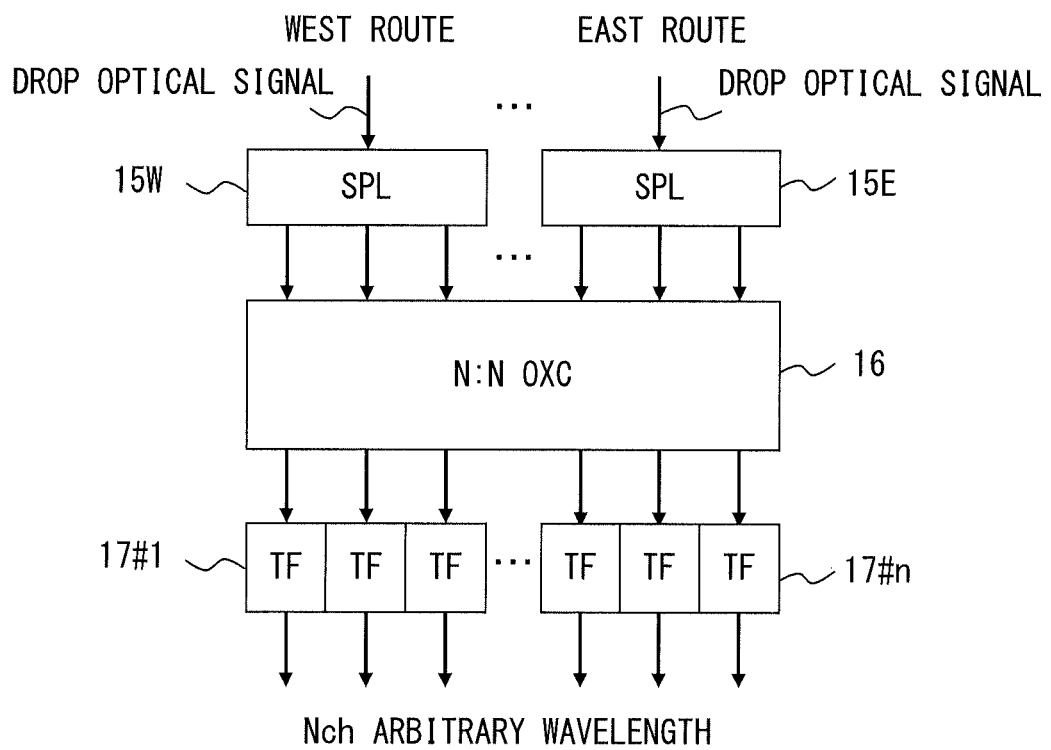

FIG. 7 is a diagram illustrating the configuration to realize the drop function of the optical add-drop multiplexer 1. In the optical add-drop multiplexer 1, when a plurality of wavelengths are selected by the drop-wavelength selective switch 14E from a WDM optical signal input from the EAST route, a drop optical signal including the selected wavelengths is input to the optical splitter 15E. In this case, a plurality of drop optical signals generated by the optical splitter 15E are guided to different input ports of the optical cross connect 16. The drop optical signals are respectively guided to tunable filters 17#1-17#n specified by the wavelength path control unit 2. The similar operation applies to a WDM optical signal input from the WEST route.

Each of the tunable filters 17#1-17#n selects a desired wavelength (for example, a wavelength specified by the wavelength path control unit 2) from the drop optical signal guided from the optical cross connect 16. Therefore, according to the configuration, an optical signal of a desired wavelength may be extracted from a WDM optical signal input from a arbitrary route and may be transferred to a corresponding terminal (or, transponder).

FIG. 8 is a diagram illustrating another configuration to realize the drop function of the optical add-drop multiplexer 1. In the configuration presented in FIG. 2, when a plurality of wavelengths are selected by the drop-wavelength selective switches 14E, 14W, a WDM optical signal including the selected wavelengths is input to the optical cross connect 16. Then, the optical cross connect 16 guides the WDM optical signal to a specified tunable filter(s), and each of the tunable filter extracts an optical signal of a respectively specified wavelength.

In the configuration presented in FIG. 8, a wavelength demultiplexer 46 is provided on the input side of the optical cross connect 16. The wavelength demultiplexer 46 demultiplexes a drop optical signal with respect to wavelength. That is, the wavelength demultiplexer 46 has optical filters having transmission wavelengths that are different from each other, for the respective output ports. In the example presented in FIG. 8, the transmission wavelengths of the optical filters provided for output ports P1, P2, P3, . . . , Pn are λ1, λ2, λ3, . . . λn, respectively. Thus, the output ports of the wavelength demultiplexer 46 have wavelength dependency.

The optical process connect 16 can guide an optical signal of each input port to a desired output port. For example, when transmitting an optical signal of the wavelength λ1 to a terminal (or, a transponder) B, the optical cross connect 16 guides an optical signal output from the output port P1 of the wavelength demultiplexer 46 to the terminal B. Meanwhile, when transmitting an optical signal of the wavelength λ3 to a terminal (or, a transponder) B, the optical cross connect 16 guides an optical signal output from the output port P3 of the wavelength demultiplexer 46 to the terminal B. That is, according to this configuration, the terminal (or, the transponder) may receive an optical signal of a desired wavelength.

Meanwhile, while only one wavelength demultiplexer 46 is depicted in the example presented in FIG. 8, in order to realize the configuration presented in FIG. 2, two wavelength demultiplexers corresponding to the optical splitters 15E, 15W may be provided. That is, the wavelength demultiplexer presented in FIG. 8 may be provided for each route that the optical add-drop multiplexer 1 has. In addition, in the configuration presented in FIG. 8, since optical filters (λ1-λn) are provided within the wavelength demultiplexer 46, the tunable filters 17#1-17#n do not have to be provided.

FIG. 9 is a diagram illustrating yet another configuration to realize the drop function of the optical add-drop multiplexer 1. In the configuration presented in FIG. 9, optical signals of wavelengths selected from the WDM optical signal of each route are combined by an optical coupler 47. The wavelength demultiplexer 46 demultiplexes the optical signal obtained by the optical coupler 47 with respect to wavelength. The optical cross connect 16 guides the optical signal of each wavelength to a respectively specified terminal (or, a transponder). Therefore, according to this configuration, an optical signal of a arbitrary wavelength may be extracted from a WDM optical signal of a arbitrary route and may be guided to a desired terminal as well.

Figure 10:
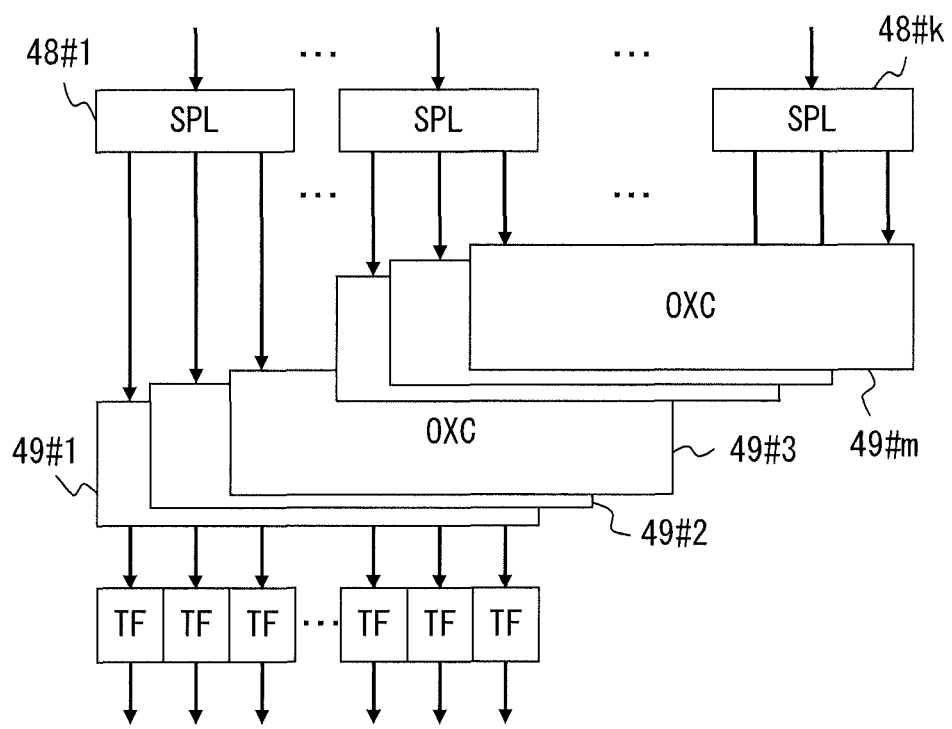

FIG. 10 is a diagram illustrating yet another configuration to realize the drop function of the optical add-drop multiplexer 1. The optical cross connect 16 presented in FIG. 2 is realized by a plurality of optical cross connects 49#1-49#m in the configuration presented in FIG. 10. The optical splitters 48#1-48#k are provided for each route similar to the configuration presented in FIG. 2. Then, output optical signals of the optical splitters 48#1-48#k are guided to the optical cross connects 49#1-49#m. As an example, the output optical signal of the optical splitter 48#1 is guided to the first input port of each of the optical cross connects 49#1-49#m. Meanwhile, the output optical signal of the optical splitter 48#k is guided to the k-th input port of each of the optical cross connects 49#1-49#m.

Examples of the Add Operation and the Drop Operation

Examples of the add operation and the drop operation of the optical add-drop multiplexer 1 are explained. In the following explanation, it is assumed that the optical add-drop multiplexer 1 has two routes (an EAST route and a WEST route), That is, the optical add-drop multiplexer 1 is in the 2-degree configuration. Meanwhile, as a variation of the example, a configuration of 3-degree or more may be adopted. As an example of such a case, an example of the 8-degree configuration is described later.

Figure 11:
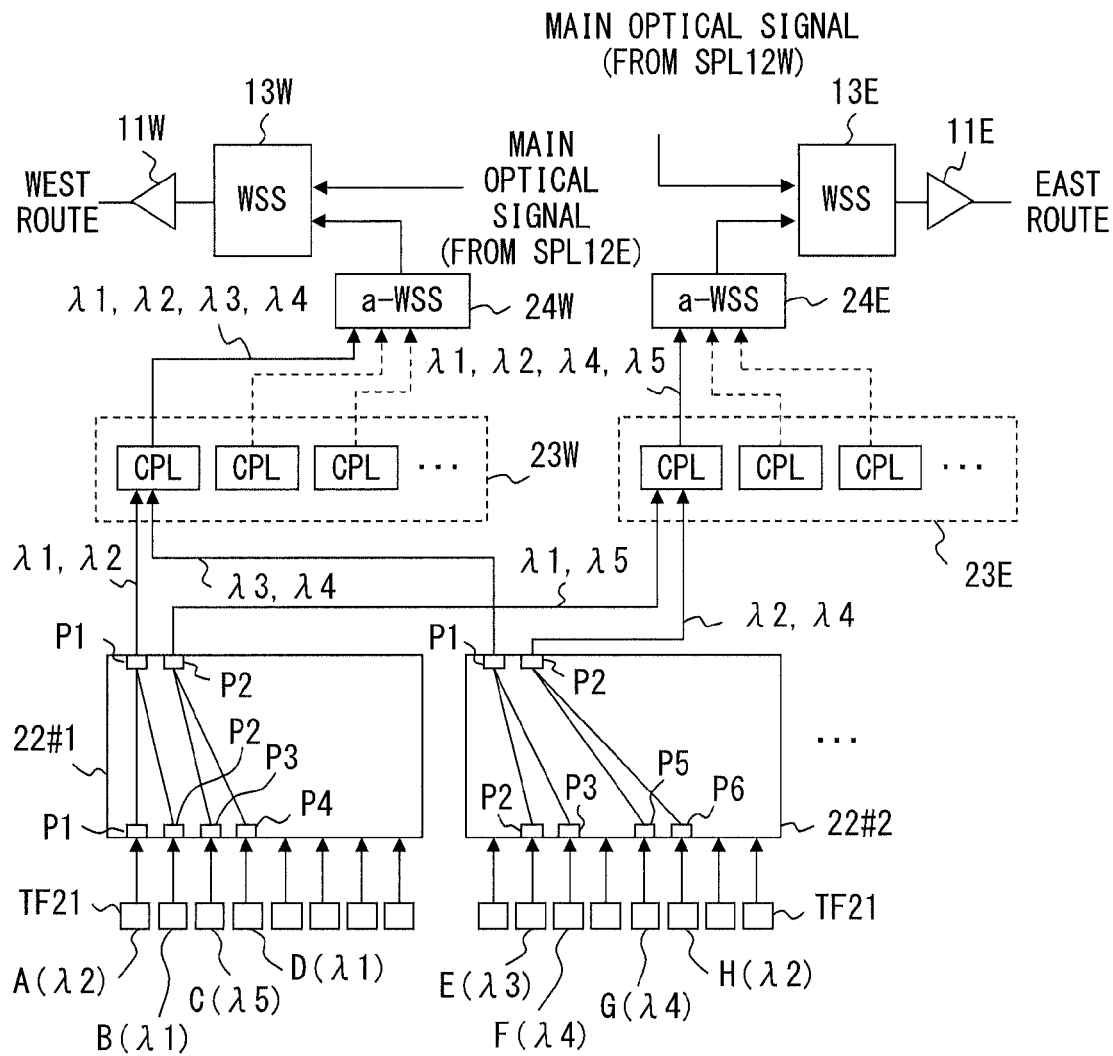
FIG. 11 is a diagram presenting the first example of an add operation.

FIG. 11 is a diagram presenting the first example of the add operation of the optical add-drop multiplexer 1. Here, in order to make the drawing easier to view, only the optical amplifiers 11E, 11W, the wavelength selective switches 13E, 13W, the tunable filters 21#1-21#n, the optical cross connect 22, the optical couplers 23E, 23W, add-wavelength selective switches 24E and 24W are depicted.

The optical cross connect 22 has, in this example, a plurality of optical cross connects 22#1, 22#2, . . . . Each of the optical cross connects 22#1, 22#2, . . . are, in this example, in the 8 input-8 output configuration. Each of the optical couplers 23E, 23W includes, in this example, a plurality of optical couplers.

In the optical add-drop multiplexer configured as described above, it is assumed that optical signals A, B, E, F are output to the EAST route, and optical signals C, D, G, H are output to the WEST route. The wavelengths of optical signals A, B, E, F are λ2, λ1, λ3, λ4, respectively. In addition, the optical signals A, B, E, F, are input to the input ports P1, P2 of the optical cross connect 22#1, and the input ports P2, P3 of the optical cross connect 22#2, respectively. Meanwhile, the wavelengths of optical signals C, D, G, H are λ5, λ1, λ4, λ2, respectively. In addition, the optical signals C, D, G, H are input to the input ports P3, P4 of the optical cross connect 22#1 and the input ports P5, P6 of the optical cross connect 22#2, respectively.

The optical signals A-H are respectively transmitted from the terminals and input to the optical cross connects 22#1, 22#2 through corresponding tunable filters 21#1-21#n. In addition, between the respective terminals and the tunable filters 21#1-21#n, transponders may be provided respectively.

The optical cross connect 22#1 guides an optical signal A of the input port P1 to the optical coupler 23W in order to output the optical signal A to the WEST route. Here, the optical coupler 23W is optically coupled to the output port P1 of the optical cross connect 22#1. Therefore, the optical cross connect 22#1 guides the optical signal A from the input port P1 to the output port P1. In addition, the optical cross connect 22#1 guides an optical signal B of the input port P2 to the optical coupler 23E in order to output the optical signal B to the WEST route. That is, the optical cross connect 22#1 guides the optical signal B from the input port P2 to the output port P1. Accordingly, the optical cross connect 22#1 combines the optical signals A, B and output the signals to the optical coupler 23W.

Figure 12:
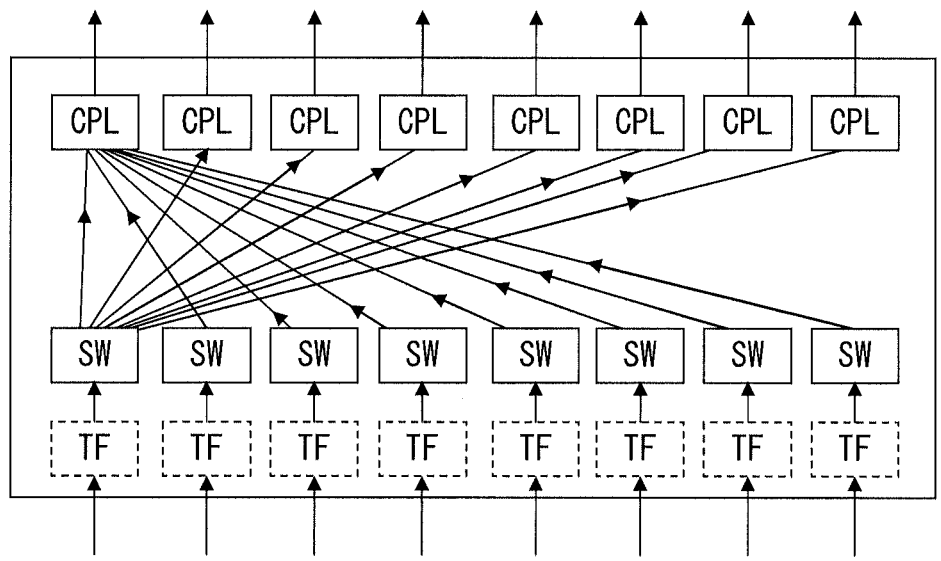
FIG. 12 is a diagram presenting the configuration of an optical cross connect used in the add operation.

FIG. 12 is a diagram presenting the configuration of the optical cross connect 22#1. The optical cross connect 22#1 has 1×8 switch (SW) for each input port, and has 8×1 coupler (CPL) for each output port. The 1×8 switch guides an input optical signal to a specified output port according to a control signal from the wavelength path control unit 2. At this time, the wavelength path control unit 2 determines the wavelength paths so that optical signals of the same wavelength are not guided to the same output port. When optical signals are guided from a plurality of input ports, the 8×1 coupler combines and outputs the plurality of optical signals.

The optical cross connect 22#1 may have, while there is no particular limitation, the tunable filters 21#1-21#n presented in FIG. 2 inside. In this case, a tunable filter (TF) is provided respectively for each of the input ports. Meanwhile, the configuration described above is common to the optical cross connects 22#1, 22#2, . . . .

The optical cross connect 22#2 guides an optical signal A of the input port P2 to the optical coupler 23W in order to output the optical signal E to the WEST route. Here, the optical coupler 23W is optically coupled to the output port P1 of the optical cross connect 22#2. Therefore, the optical cross connect 22#2 guides the optical signal E from the input port P2 to the output port P1. In addition, the optical cross connect 22#2 guides an optical signal F of the input port P3 to the optical coupler 23W in order to output the optical signal F to the WEST route. Accordingly, the optical cross connect 22#2 combines the optical signals E, F and output the signals to the optical coupler 23W.

The optical coupler 23W combines and outputs the optical signal A, the optical signal B, the optical signal E, the optical signal F. At this time, the output optical signal of the optical coupler 23W includes wavelengths $\lambda 1, \lambda 2, \lambda 3, \lambda 4$. Meanwhile, when another optical signal is further input to the optical coupler 23W, the optical coupler 23W combines and output the optical signals A, B, E, F and the other optical signal. Then, the output optical signal of the optical coupler 23W is guided to the add-wavelength selective switch 24W.

The add-wavelength selective switch 24W selects a wavelength(s) specified by the wavelength path control unit 2 from the output optical signals of the optical coupler 23W. Here, it is assumed that the add-wavelength selective switch 24W selects wavelengths $\lambda 1, \lambda 2, \lambda 3, \lambda 4$. Then, the add-wavelength selective switch 24W guides the optical signals of the selected wavelengths $\lambda 1, \lambda 2, \lambda 3, \lambda 4$ to the wavelength selective switch 13W.

To the wavelength selective switch 13W, an optical signal guided through the optical splitter 12E from the EAST route and an optical signal guided from the add-wavelength selective switch 24W are input. Here, the optical signal guided through the optical splitter 12E from the EAST route is referred to as a "main optical signal" and the optical signal guided from the add-wavelength selective switch 24W is referred to as an "add optical signal".

The wavelength selective switch 13W generates a WDM optical signal to be output to the WEST route from the main optical signal and the add optical signal, according to the instruction from the wavelength path control unit 2. At this time, the wavelength selective switch 13W selects a wavelength that "passes through" the optical add-drop multiplexer 1 from the main optical signal, and selects a wavelength to "add" to the main signal, from the add optical signal. In this example, wavelengths $\lambda 1, \lambda 2, \lambda 3, \lambda 4$ are selected from the add optical signal. In this case, the wavelength selective switch 13W is controlled so as not to select the wavelength wavelengths $\lambda 1, \lambda 2, \lambda 3, \lambda 4$ from the main optical signal. Accordingly, the add optical signal including the optical signals A, B, E, F is added to the main signal and output to the WEST route.

The operation to output optical signals C, D, G, H to the EAST route is similar to the operations to output the optical signals A, B, E, F to the WEST route. That is, the optical cross connect 22#1 guides the optical signal C from the input port P3 to the output port P2, and guides the optical signal D from the input port P4 to the output port P2. Accordingly, the optical cross connect 22#1 combines the optical signals C, D and output the signals to the optical coupler 23E. Similarly, the optical cross connect 22#2 guides the optical signal G from the input port P5 to the output port P2, and guides the optical signal H from the input port P6 to the output port P2. Accordingly, the optical cross connect 22#2 combines the optical signals G, H and output the signals to the optical coupler 23E.

The optical coupler 23E combines and outputs the optical signal C, the optical signal D, the optical signal G, the optical signal H. At this time, the output optical signal of the optical coupler 23E includes wavelengths $\lambda 1, \lambda 2, \lambda 4, \lambda 5$. The add-wavelength selective switch 24E selects a wavelength(s) specified by the wavelength path control unit 2 from the output optical signals of the optical coupler 23E. Here, it is assumed that the add-wavelength selective switch 24E selects wavelengths $\lambda 1, \lambda 2, \lambda 4, \lambda 5$.

To the wavelength selective switch 13E, an optical signal guided through the optical splitter 12W from the WEST route (main optical signal) and an optical signal guided from the add-wavelength selective switch 24E (add optical signal) are input. Then, the wavelength selective switch 13E generates a WDM optical signal to be output to the EAST route from the main optical signal and the add optical signal, according to the instruction from the wavelength path control unit 2. In this example, the wavelengths $\lambda 1, \lambda 2, \lambda 4, \lambda 5$ are selected from the add optical signal. In this case, the wavelength selective switch 13E is controlled so as not to select the wavelengths $\lambda 1, \lambda 2, \lambda 4, \lambda 5$ from the main optical signal. Accordingly, the add optical signal including the optical signals C, D, G, H is added to the main signal and output to the EAST route.

Thus, in the example presented in FIG. 11, an optical signal transmitted from a arbitrary terminal can be output to a desired route. In addition, in the case of outputting a plurality of optical signals to different routes, the plurality of optical signals may use the same wavelength. For example, both of the optical signal B that is output to the WEST route and the optical signal D that is output to the EAST route use the wavelength $\lambda 1$.

FIG. 13 is a diagram presenting the second example of the add operation of the optical add-drop multiplexer 1. In the second example, the optical add-drop multiplexer 1 does not have the add-wavelength selective switches 24E, 24W.

In the second example presented in FIG. 13, the optical couplers 23E, 23W respectively have a plurality of optical couplers. Therefore, an optical coupler 51E combines a plurality of optical signals output from the plurality of optical couplers in the optical coupler 23E and guides the signals to the wavelength selective switch 13E. Similarly, the optical coupler 51W combines optical signals output from the plurality of optical couplers in the optical coupler 23W and guides the signals to the wavelength selective switch 13W.

The wavelength selective switches 13E, 13W respectively generate a WDM optical signal by adding an add optical signal to a main optical signal, in the similar manner as in the first example. At this time, the wavelength selective switch 13E may be configured to include the function of the add-wavelength selective switch 24E of the first example. Similarly, the wavelength selective switch 13W may be configured to include the function of the add-wavelength selective switch 24W of the first example.

FIG. 14 is a diagram presenting the third example of the add operation of the optical add-drop multiplexer 1. In the third example, the optical cross connects 22#1, 22#2, may be in the configuration presented in FIG. 12, or may be a simple matrix switch. A simple matrix switch guides an optical signal input from each input port to one output port, and guides an optical signal of one input port to each output port. That is, in the third example, the optical cross connects 22#1, 22#2, ... do not have to have the 8×1 coupler (CPL) presented in FIG. 12.

Meanwhile, in FIG. 14, the symbols P2-P7 of the input ports P1-P8 of the optical cross connect 22#1 are omitted, and the symbols P2-P7 of the output ports P1-P8 are omitted. In FIG. 14, while they are not described in order to make the drawing easier to view, the six input ports without symbols are P2-P7 in order from the input port P1 to P8. In the same manner, the six output ports without symbols are P2-P7 in order from the output port P1 to P8.

The output ports P1-P4 of the optical cross connect 22#1 are optically coupled to the optical coupler 23W. Meanwhile, the output ports P5-P8 of the optical cross connect 22#1 are optically coupled to the optical coupler 23E.

In the optical add-drop multiplexer 1 configured as described above, similar to the first embodiment, it is assumed that optical signals A, B, E, F are output to the WEST route, and optical signals C, D, G, H are output to the EAST route. The wavelengths of the optical signals A, B, E, F are $\lambda 2$, $\lambda 1$, $\lambda 3$, $\lambda 4$, respectively, and the wavelengths of the optical signals C, D, G, H are $\lambda 5$, $\lambda 1$, $\lambda 4$, $\lambda 2$, respectively. However, in the second example, the optical signals A, B, E, F are input to the input ports P1, P3, P4, P6 of the optical cross connect 22#1, respectively. Meanwhile, the optical signals C, D, G, H are input to the input ports P2, P5, P7, P8 of the optical cross connect 22#1, respectively.

The optical cross connect 22#1 guides an optical signal A of the input port P1 to the optical coupler 23W in order to output the optical signal A to the WEST route. Here, the optical coupler 23W is optically coupled to the output ports P1-P4 of the optical cross connect 22#1. Therefore, the optical cross connect 22#1 guides the optical signal A to one of the output ports P1-P4. In the example presented in FIG. 14, the optical cross connect 22#1 guides the optical signal A from the input port P1 to the output port P1. Accordingly, the optical signal A is guided to the optical coupler 23W.

Meanwhile, the optical cross connect 22#1 guides the optical signals B, E, F respectively to the optical coupler 23W. At this time, the optical signals B, E, F are guided to the output ports P1-P4 so that they do not overlap with the optical signal A. In the example presented in FIG. 14, the optical cross connect 22#1 guides the optical signal B of the input port P3 to the output port P2, guides the optical signal E of the input port P4 to the output port P3, and guides the optical signal F of the input port P6 to the output port P4. Accordingly, the optical signals B, E, F are also guided to the optical coupler 23W.

The optical coupler 23W combines the optical signals A, B, E, F (wavelengths $\lambda 1$-$\lambda 4$) and outputs the signals, in the similar manner as in the first example. Meanwhile, the operations of the add-wavelength selective switch 24W and the wavelength selective switch 13W are substantially the same as in the first example. Therefore, according to the operations described above, a WDM optical signal to which the optical signals A, B, E, F are inserted is output to the WEST route.

The operations to output the optical signals C, D, G, H to the EAST route is substantially the same as the operations to output the optical signals A, B, E, F to the WEST route. However, the optical cross connect 22#1 guides the optical signal C of the input port P2 to the output port P5, guides the optical signal D of the input port P5 to the output port P6, guides the optical signal G of the input port P7 to the output port P7, and guides the optical signal H of the input port P8 to the output port P8. Accordingly, the optical signals C, D, G, H are guided to the optical coupler 23E.

Thus, a configuration in which the optical cross connects 22#1, 22#2, do not have the optical coupler function may also realize the same operation as in the first example.

FIG. 15 is a diagram presenting the fourth example of the add operation of the optical add-drop multiplexer 1. In the fourth example, the optical add-drop multiplexer 1 does not have the add-wavelength selective switches 24E, 24W. Meanwhile, the difference between the third example and the fourth example is the same as the difference between the first example and the second example described above. Therefore, explanation regarding the fourth example is omitted.

Figure 16:
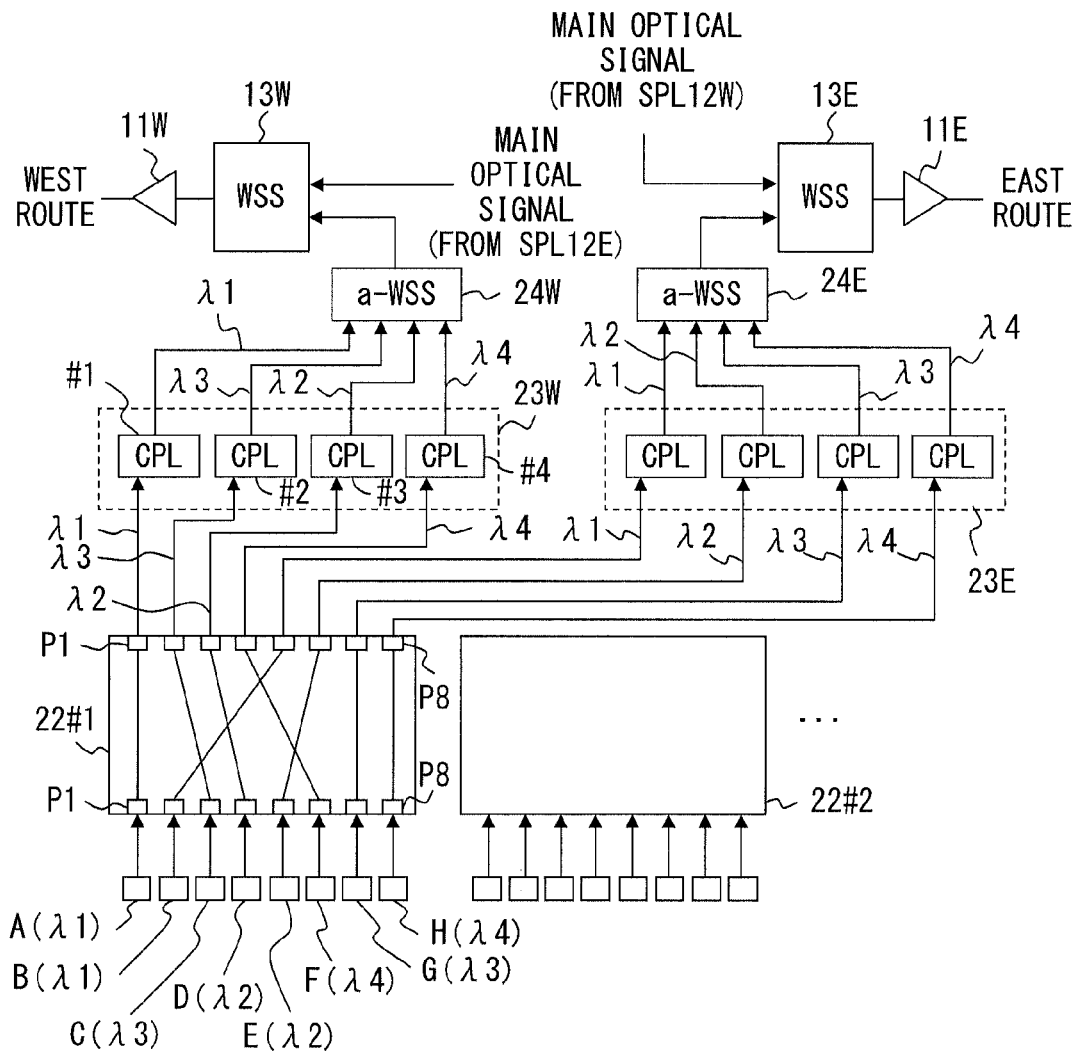
FIG. 16 is a diagram presenting the fifth example of the add operation.

FIG. 16 is a diagram presenting the fifth example of the add operation of the optical add-drop multiplexer 1. In the fifth example, the operation of the optical cross connect 22#1 is substantially the same as the third example presented in FIG. 14. However, input signals of the input ports P1-P8 of the optical cross connect 22#1 are different from those in the third example.

In the similar manner as in the first through fourth examples, in the fifth example, an optical signal to be output to the WEST route is guided to the optical coupler 23W. However, in the fifth example, optical signals A ($\lambda 1$), C ($\lambda 3$), D, ($\lambda 2$), F ($\lambda 4$) are guided to respective optical couplers (#1-#4) in the optical coupler 23W. In the example presented in FIG. 16, the optical signals A, C, D, F are output from the output ports P1, P2, P3, P4 of the optical cross connect 22#1 and guided to the optical couplers 23W#1, 23W#2. 23W#3, 23W#4, respectively. At this time, optical signals of different wavelengths may be guided from other optical cross connects to the optical couplers 23W#1-23W#4, respectively. Meanwhile, the operations of the add-wavelength selective switch 24W and the wavelength selective switch 13W are substantially the same as in the first or the third embodiment.

An optical signal to be output to the EAST route is guided to the optical coupler 23E by the optical cross connect 22#1. Other operations are substantially the same as the operations for outputting an optical signal to the WEST route. Therefore, according to this configuration, an optical signal input to each input port may be guided to a desired route as well.

FIG. 17 is a diagram presenting the first example of the drop operation of the optical add-drop multiplexer 1. Here, in order to make the drawing easier to view, only the optical amplifiers 11E, 11W the optical splitters 12E, 12W, the drop-wavelength selective switches 14E, 14W, the optical splitters 15E, 15W, the optical cross connect 16, the tunable filters 17#1-17#n are depicted.

The optical cross connect 16 has, in this example, a plurality of optical cross connects 16#1, 16#2, .... Each of the optical cross connects 16#1, 16#2, ... are in the 8 input-8 output configuration. Each of the optical splitters 15E, 15W has, in this example, a plurality of optical splitters, respectively.

In the optical add-drop multiplexer configured described above, it is assumed that optical signals of wavelengths $\lambda 1$, $\lambda 2$, $\lambda 3$, $\lambda 4$ are extracted from a WDM optical signal input from the WEST route, and transmitted to terminals B, A, E, F, respectively. In addition, it is assumed that optical signals of wavelengths $\lambda 1$, $\lambda 2$, $\lambda 4$, $\lambda 5$ are extracted from a WDM optical signal input from the EAST route, and transmitted to terminals D, H, G, C, respectively. Meanwhile, in the following explanation, a WDM optical signal input to the optical add-drop multiplexer 1 from the EAST route may be referred to as an E-WDM optical signal, and a WDM optical signal input to the optical add-drop multiplexer 1 from the WEST route may be referred to as a W-WDM optical signal. In addition, optical signals of wavelengths $\lambda 1$, $\lambda 2$, $\lambda 3$, $\lambda 4$, $\lambda 5$ may be referred to as a λ1 optical signal, a λ2 optical signal, a λ3 optical signal, a λ4 optical signal, a λ5 optical signal, respectively.

The optical splitter 12W splits the W-WDM optical signal and guides it to the wavelength selective switch 13E and the drop-wavelength selective switch 14W. The operation of the wavelength selective switch 13E is as described with reference to FIG. 11, for example. The drop-wavelength selective switch 14W selects the λ1 optical signal, the λ2 optical signal, the λ3 optical signal, the λ4 optical signal from the W-WDM optical signal according to the instruction from the wavelength path control unit 2. The optical signals selected by the drop-wavelength selective switch 14W are guided to the optical splitter 15W. At this time, the λ1 optical signal, the λ2 optical signal, the λ3 optical signal, the λ4 optical signal may be guided to the optical splitter 15W as a WDM optical signal. Therefore, in the explanation hereafter, this WDM optical signal output from the drop-wavelength selective switch 14W may be referred to as an W-λ1/λ2/λ3/λ4 optical signal.

The optical splitter 15W has, as described above, a plurality of optical splitters 15W#1, 15W#2, . . . . Then, the W-λ1/λ2/λ3/λ4 optical signal is, in this example, guided to the optical splitter 15W#1. Meanwhile, to the optical splitters 15W#2, 15W#3, optical signals of other wavelengths selected by the drop-wavelength selective switch 14W are input.

The output port of the optical splitter 15W#1 is optically coupled to the input port P1 of each of the optical cross connects 16#1, 16#2, . . . . That is, the output signal of the optical splitter 15W#1 is guided to each of the input port P1 of the optical cross connects 16#1, 16#2. Accordingly, the W-λ1/λ2/λ3/λ4 optical signal is guided to the input port P1 of the optical cross connect 16#1. In addition the W-λ1/λ2/λ3/λ4 optical signal is guided to the input port P1 of the optical cross connect 16#2 as well.

FIG. 18 is a diagram presenting the configuration of the optical cross connect 16#1. The optical cross connect 16#1 has 1×8 splitter (SPL) for each input port, and has 8×1 switch (SW) for each output port. The 1×8 splitter respectively splits an input signal and guides the signal to all the output ports. Meanwhile, the 8×1 switch selects an optical signal from an input port specified by the wavelength path control unit 2.

The optical cross connect 16#1 may have, while there is no particular limitation, the tunable filters 17#1-17#n presented in FIG. 2 inside. In this case, a tunable filter (TF) is provided respectively for each of the output ports. Meanwhile, the configuration described above is common to the optical cross connects 16#1, 16#2, . . . .

The optical signal of the input port P1 of the optical cross connect 16#1 is split by the 1×8 splitter presented in FIG. 18, and guided to each of the output ports P1-P8. Similarly, the optical signal of the input port P1 of the optical cross connect 16#2 is also guided to each of the output ports P1-P8.

Here, the wavelength path control unit 2 gives the following instructions to the optical cross connect 16#1.
Output port P1: select the optical signal of the input port P1
Output port P2: select the optical signal of the input port P1
Output port P3: select the optical signal of the input port P2
Output port P4: select the optical signal of the input port P2

Meanwhile, the wavelength path control unit 2 gives the following instructions to the optical cross connect 16#2.
Output port P2: select the optical signal of the input port P1
Output port P3: select the optical signal of the input port P1
Output port P5: select the optical signal of the input port P2
Output port P6: select the optical signal of the input port P2

Therefore, the W-λ1/λ2/λ3/λ4 optical signal is output respectively from each of the output ports P1, P2 of the optical cross connect 16#1 and the output ports P2, P3 of the optical cross connect 16#2.

Furthermore, the wavelength path control unit 2 controls each of the tunable filters 17 as follows. In the following explanation, each tunable filter 17 is identified as "#i#k". Here, "i" identifies the optical cross connects 16#1, 16#2, and "k" identifies the output ports P1-P8 of each optical cross connect. For example, "#1#1" indicates the tunable filter optically coupled to the output port P1 of the optical cross connect 16#1.
1#1: transmission wavelength=λ2
1#2: transmission wavelength=λ1
1#3: transmission wavelength=λ5
1#4: transmission wavelength=λ1
2#2: transmission wavelength=λ3
2#3: transmission wavelength=λ4
2#5: transmission wavelength=λ4
2#6: transmission wavelength=λ2

To the tunable filter 17#1#1, the W-λ1/λ2/λ3/λ4 optical signal is guided by the optical cross connect 16#1. Here, the transmission wavelength of the tunable filter 17#1#1 is controlled to λ2, as described above. Therefore, the tunable filter 17#1#1 extracts the λ2 optical signal from the W-λ1/λ2/λ3/λ4 optical signal. Accordingly, the λ2 optical signal extracted from the W-WDM optical signal is transmitted to the terminal A.

Similarly, the tunable filter 17#1#2 extracts the λ1 optical signal from the W-λ1/λ2/λ3/λ4 optical signal. In addition, the tunable filter 17#2#2 extracts the λ3 optical signal from the W-λ1/λ2/λ3/λ4 optical signal. Furthermore, the tunable filter 17#2#3 extracts the λ4 optical signal from the W-λ1/λ2/λ3/λ4 optical signal. Accordingly, the λ1, λ3, λ4 optical signals extracted from the W-WDM optical signal are transmitted to the terminals B, E, F, respectively.

The operation to extract an optical signal of a specified wavelength from a WDM optical signal (E-WDM optical signal) input from the EAST route is substantially the same as the operation to extract an optical signal of specified wavelength from the W-WDM optical signal. That is, E-λ1/λ2/λ4/λ5 optical signal is generated by the drop-wavelength selective switch 14E. The E-λ1/λ2/λ4/λ5 optical signal is guided to the tunable filters 17#1#3, 17#1#4, 17#2#5, 17#2#6 by the optical splitter 15E and the optical cross connects 16#1, 16#2. Then, the tunable filters 17#1#3, 17#1#4, 17#2#5, 17#2#6 extract λ5, λ1, λ4, λ2 optical signals, respectively, from the E-λ1/λ2/λ4/λ5 optical signal. Accordingly, the λ1, λ2, λ4, λ5 optical signals extracted from the E-WDM optical signal are transmitted to the terminals D, H, G, C, respectively.

Thus, the optical add-drop multiplexer 1 of the embodiment can extract an optical signal of a desired wavelength from a WDM optical signal on a arbitrary route and transmit the extracted signal to a desired terminal. Therefore, according to the configuration of the embodiment, the wavelength path is set up or changed flexibly.

FIG. 19 is a diagram presenting the second example of the drop operation of the optical add-drop multiplexer 1. In the second example, the optical add-drop multiplexer 1 does not have the drop-wavelength selective switches 14E, 14W.

In the example illustrated in FIG. 19, the optical splitters 15E, 15W respectively have a plurality of optical splitters. Therefore, an optical splitter 61E splits the E-WDM optical signal and guides the signal to the plurality of optical splitters in the optical splitter 15E. Similarly, the optical splitter 61W splits the W-WDM optical signal and guides the signal to the plurality of optical splitters in the optical splitter 15W.

The W-WDM optical signal is guided to the input port P1 of the optical cross connect 16#1 and the input port P1 of the optical cross connect 16#2 by the optical splitter 61W and the optical splitter 15W. Then, the W-WDM optical signal is guided to the tunable filters 17#1#1, 17#1#2 by the optical cross connect 16#1, and guided to the 17#2#2, 17#2#3 by the optical cross connect 16#2.

The operations of the tunable filters 17#1#1, 17#1#2, 17#2#2, 17#2#3 are substantially the same as in the first example. However, in the second example, each of the tunable filters 17#1#1, 17#1#2, 17#2#2, 17#2#3 extracts an optical signal of a corresponding specified wavelength from the W-WDM optical signal. Similarly, an optical signal of a corresponding specified wavelength is extracted from the E-WDM optical signal by each of the tunable filters 17#1#3, 17#1#4, 17#2#5, 17#2#6.

Figure 20:
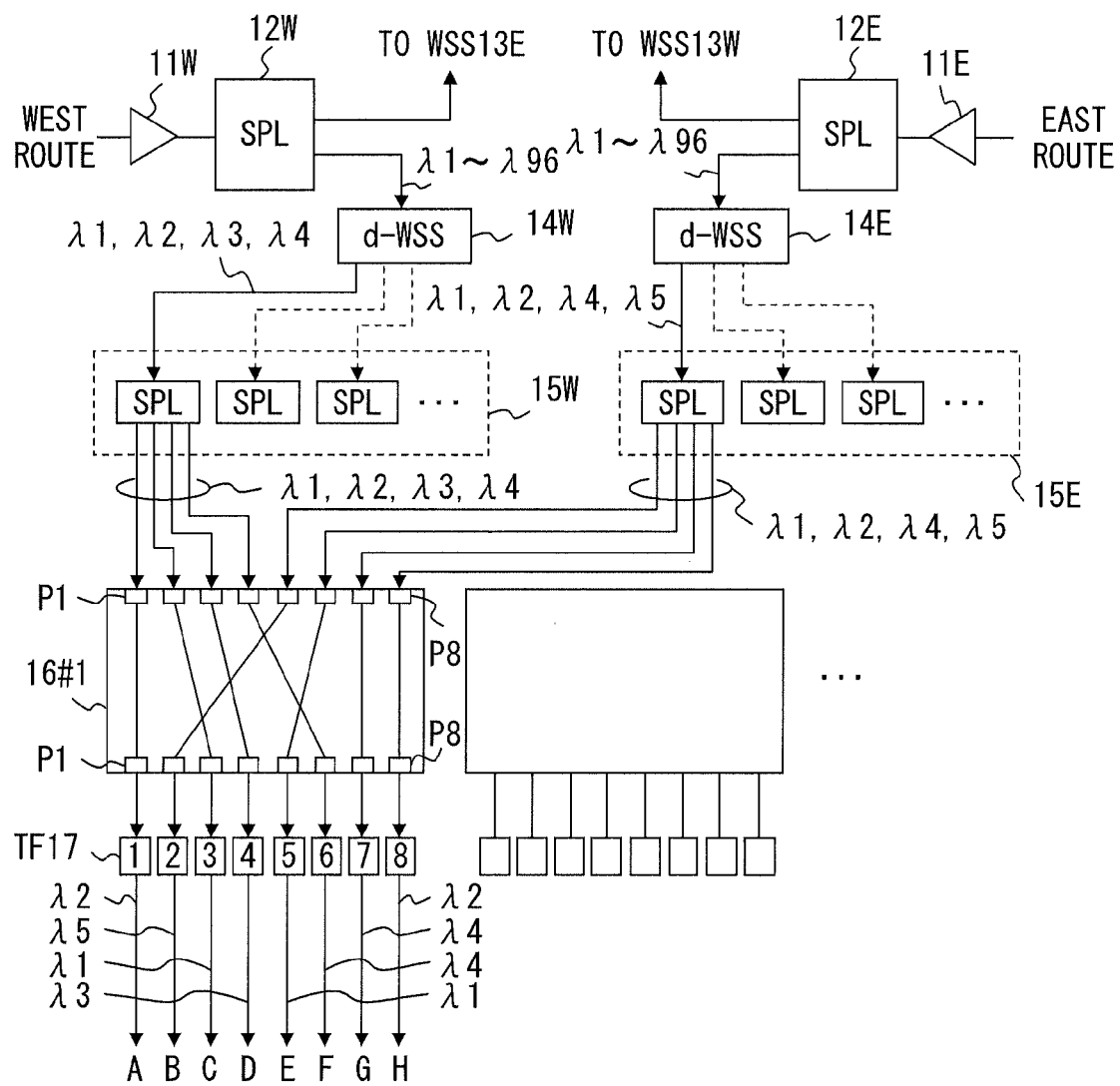
FIG. 20 is a diagram presenting the third example of the drop operation.

FIG. 20 is a diagram presenting the third example of the drop operation of the optical add-drop multiplexer 1. In the third example, it is assumed that a $\lambda 1$ optical signal, a $\lambda 2$ optical signal, a $\lambda 3$ optical signal, a $\lambda 4$ optical signal in the W-WDM optical signal are transmitted to terminals C, A, D, F, respectively. In addition, it is assumed that a $\lambda 1$ optical signal, a $\lambda 2$ optical signal, a $\lambda 4$ optical signal, a $\lambda 5$ optical signal in the E-WDM optical signal are transmitted to terminals E, H, G, B, respectively.

In the third example, the operations of the drop-wavelength selective switches 14E, 14W are substantially the same as in the first example. That is, the drop-wavelength selective switch 14W generates the W-$\lambda 1/\lambda 2/\lambda 3/\lambda 4$ optical signal from the W-WDM optical signal. Meanwhile, the drop-wavelength selective switch 14E generates the E-$\lambda 1/\lambda 2/\lambda 4/\lambda 5$ optical signal from the E-WDM optical signal.

The optical splitter 15W guides the W-$\lambda 1/\lambda 2/\lambda 3/\lambda 4$ optical signal to the input ports P1-P4 of the optical cross connect 16#1. Similarly, the optical splitter 15E guides the E-$\lambda 1/\lambda 2/\lambda 4/\lambda 5$ optical signal to the input ports P5-P8 of the optical cross connect 16#1.

The optical cross connect 16#1 connects the input ports P1-P8 and the output ports P1-P8 as presented in FIG. 20, according to the instruction from the wavelength path control unit 2. Accordingly, the W-$\lambda 1/\lambda 2/\lambda 3/\lambda 4$ optical signal is guided to the tunable filters 17#1, #3. #4, #6. Meanwhile, the E-$\lambda 1/\lambda 2/\lambda 4/\lambda 5$ optical signal is guided to the tunable filters 17#2, #5. #7, #8.

The tunable filters 17#1-17#8 are controlled as follows by the wavelength path control unit 2.
1: transmission wavelength=$\lambda 2$
2: transmission wavelength=$\lambda 5$
3: transmission wavelength=$\lambda 1$
4: transmission wavelength=$\lambda 3$
5: transmission wavelength=$\lambda 1$
6: transmission wavelength=$\lambda 4$
7: transmission wavelength=$\lambda 4$
8: transmission wavelength=$\lambda 2$ The tunable filter 17#1 extracts $\lambda 2$ optical signal from the W-$\lambda 1/\lambda 2/\lambda 3/\lambda 4$ optical signal. Accordingly, the terminal A receives the $\lambda 2$ optical signal included in the W-$\lambda 1/\lambda 2/\lambda 3/\lambda 4$ optical signal. Similarly, the tunable filters 17#3, #4, #6 extracts $\lambda 1$, $\lambda 3$, $\lambda 4$ optical signals from the W-WDM optical signal. Therefore, the terminals C, D, F receive the $\lambda 1$, $\lambda 3$, $\lambda 4$ optical signals included in the W-WDM optical signal, respectively.

Furthermore, the tunable filters 17#2, #5, #7, #8 extract $\lambda 5$, $\lambda 1$, $\lambda 4$, $\lambda 2$ optical signals from the E-$\lambda 1/\lambda 2/\lambda 4/\lambda 5$ optical signal. Therefore, the terminals B, E, G, H receive the $\lambda 5$, $\lambda 1$, $\lambda 4$, $\lambda 2$ optical signals included in the E-WDM optical signal, respectively.

Thus, also in the third example, the optical add-drop multiplexer 1 of the embodiment can extract an optical signal of a desired wavelength from a WDM optical signal in arbitrary route and transmit the extracted signal to a desired terminal.

Meanwhile, in the third example, the optical cross connect does not have to have a function to split an input optical signal. Therefore, the optical cross connect may be configured to have, instead of the splitter (SPL), 1:8 switch to guide an input optical signal to one specified output port in FIG. 18. In this case, the switch (SW) disposed for each output port in FIG. 18 does not have to be provided.

Figure 21:
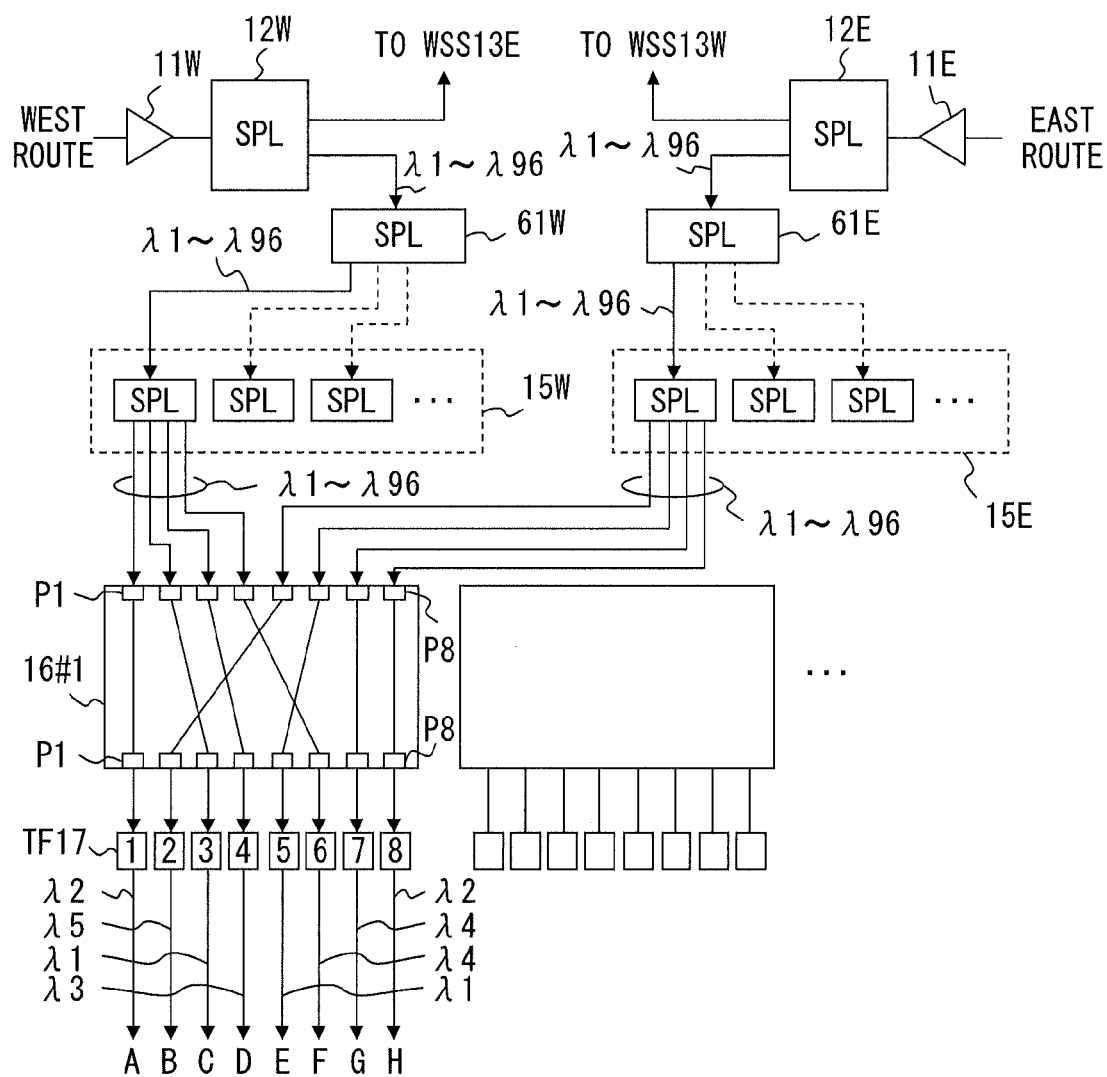
FIG. 21 is a diagram presenting the fourth example of the drop operation.

FIG. 21 is a diagram presenting the fourth example of the drop operation of the optical add-drop multiplexer 1. In the fourth example, the optical add-drop multiplexer 1 does not have the drop-wavelength selective switches 14E, 14W. The different between the third and fourth examples is substantially the same as the difference between the first and second examples. Therefore, explanation about the fourth example is omitted.

Figure 22:
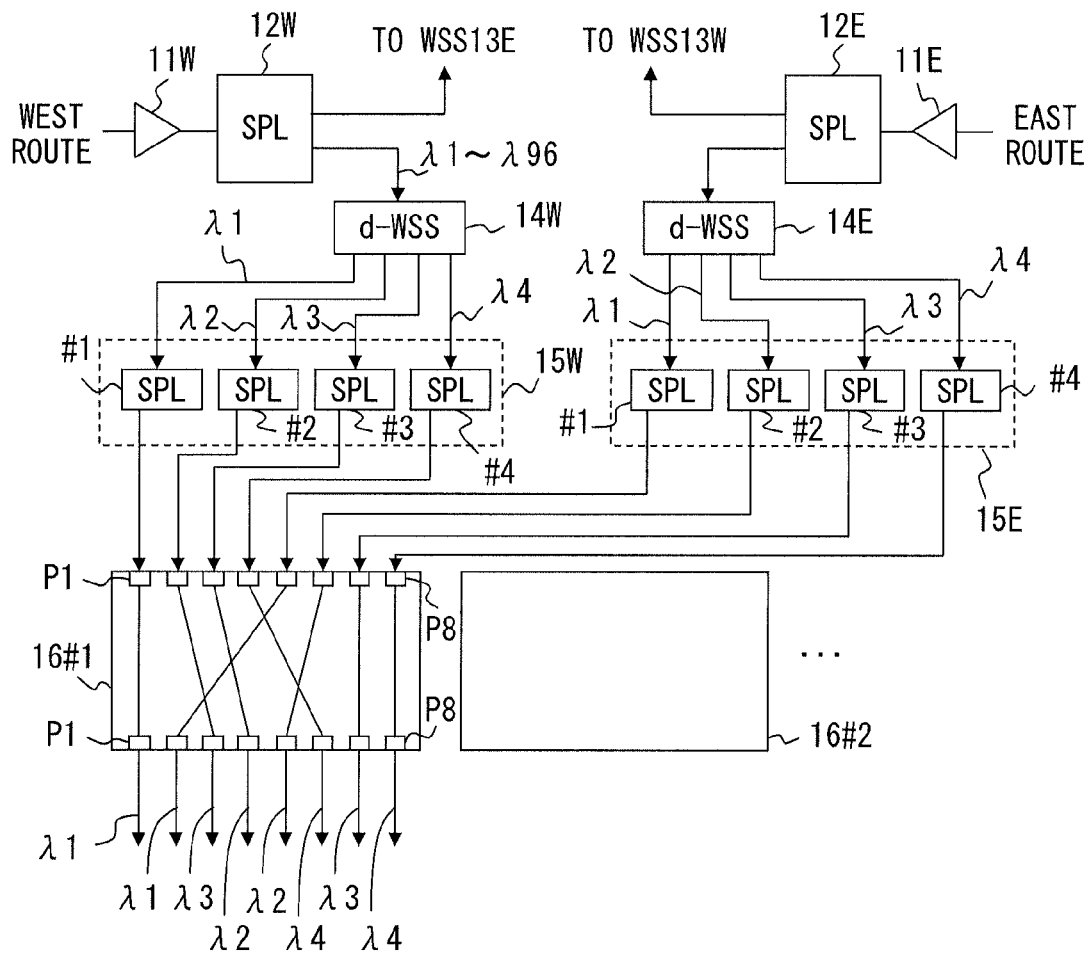
FIG. 22 is a diagram presenting the fifth example of the drop operation.

FIG. 22 is a diagram presenting the fifth example of the drop operation of the optical add-drop multiplexer 1. In the fifth example, the operation of the optical cross connect 16#1 is substantially the same as in the third example presented in FIG. 20. However, input optical signals of the input ports P1-P8 of the optical cross connect 16#1 are different from those in the third example. In addition, the optical add-drop multiplexer 1 does not need to have the tunable filters 17#1-17#n.

In the fifth example, the drop-wavelength selective switch 14E extracts $\lambda 1$, $\lambda 2$, $\lambda 3$, $\lambda 4$ optical signals from the E-WDM optical signal, and guides the extracted signals to the optical splitters #1, #2, #3, #4 in the optical splitter 15E, respectively. Similarly, the drop-wavelength selective switch 14W extracts $\lambda 1$, $\lambda 2$, $\lambda 3$, $\lambda 4$ optical signals from the W-WDM optical signal, and guides the extracted signals to the optical splitters #1, #2, #3, #4 in the optical splitter 15W, respectively.

The optical splitter 15W#1 guides the $\lambda 1$ optical signal extracted from the W-WDM optical signal to respective input ports P1 of the optical cross connects 16#1, 16#2, . . . . The optical splitters 15W#2, 15W#3, 15W#4 guide the $\lambda 2$ optical signal, the $\lambda 3$ optical signal, the $\lambda 4$ optical signal extracted from the W-WDM optical signal to respective input ports P2, input ports P3, input ports P4 of the optical cross connects 16#1, 16#2, respectively. Similarly, the optical splitters 15E#1, 15E#2, 15E#3, 15E#4 guide the $\lambda 1$ optical signal, the $\lambda 2$ optical signal, the $\lambda 3$ optical signal, the $\lambda 4$ optical signal extracted from the E-WDM optical signal to the input ports P5, input ports P6, input ports P7, input ports P8 of the optical cross connects 16#1, 16#2, . . . , respectively.

The optical cross connect 16#1 guides the input optical signals to respective specified output ports according to the instruction from the wavelength path control unit 2. Accordingly, the optical add-drop multiplexer 1 can transmit an optical signal extracted from a WDM optical signal input from arbitrary route to a desired terminal.

FIG. 23 is a diagram presenting the sixth example of the drop operation of the optical add-drop multiplexer 1. In the sixth example, an optical signal of a desired wavelength is extracted from a WDM optical signal and multicast to a plurality of terminals.

In the example presented in FIG. 23, the drop-wavelengths selective switch 14W selects $\lambda 1$ optical signal from the W-WDM optical signal. The $\lambda 1$ optical signal is spilt by the optical splitter 15W, and guided to the input port P1 of the optical cross connect 16#1 and to the input port P1 of the optical cross connect 16#2. Meanwhile, the drop-wavelengths selective switch 14E selects $\lambda 4$ optical signal from the E-WDM optical signal. The $\lambda 4$ optical signal is spilt by the optical splitter 15E, and guided to the input port P2 of the optical cross connect 16#1 and to the input port P2 of the optical cross connect 16#2.

The switching operations of the optical cross connects 16#1, 16#2 is substantially the same as in the first example presented in FIG. 17. Therefore, the λ1 optical signal extracted from the W-WDM optical signal is output from the output ports P1, P2 of the optical cross connects 16#1 and from the output ports P2, P3 of the optical cross connect 16#2. That is, the λ1 optical signal is transmitted to four terminals. Meanwhile, the λ4 optical signal extracted from the E-WDM optical signal is output from the output ports P3, P4 of the optical cross connects 16#1 and from the output ports P5, P6 of the optical cross connect 16#2. That is, the λ4 optical signal is transmitted to different four terminals.

FIG. 24 is a diagram presenting the seventh example of the drop operation of the optical add-drop multiplexer 1. In the seventh example, in the similar manner as in the sixth example, an optical signal of a desired wavelength is extracted from a WDM optical signal and multicast to a plurality of terminals.

In the seventh example, the optical cross connect 16#1 does not have a function to split an input optical signal and to guide the split signal to a plurality of output ports, similar to the third example. Therefore, the optical splitter 15W splits the λ1 optical signal and guides it to the input ports P1-P4 of the optical cross connect 16#1. In addition, the optical splitter 15E splits the λ4 optical signal and guides it to the input ports P5-P8 of the optical cross connect 16#1.

The switching operation of the optical cross connect 16#1 is substantially the same as in the third example presented in FIG. 20. Therefore, the λ1 optical signal extracted from the W-WDM optical signal is output from the output ports P1, P3, P4, P6 of the optical cross connect 16#1. That is, the λ1 optical signal is transmitted to four terminals. Meanwhile, the λ4 optical signal extracted from the E-WDM optical signal is output from the output ports P2, P5, P7, P8 of the optical cross connect 16#1. That is, the λ4 optical signal is transmitted to different four terminals.

Thus, in the sixth and seventh examples, an optical signal of a desired wavelength can be extracted from a WDM optical signal in arbitrary route and can be multicast to a plurality of desired terminals. Note that in the sixth and seventh examples, the tunable filters 17#1-17#n do not need to be provided.

Examples of an 8-Degree Optical Add-Drop Multiplexer

Figure 25:
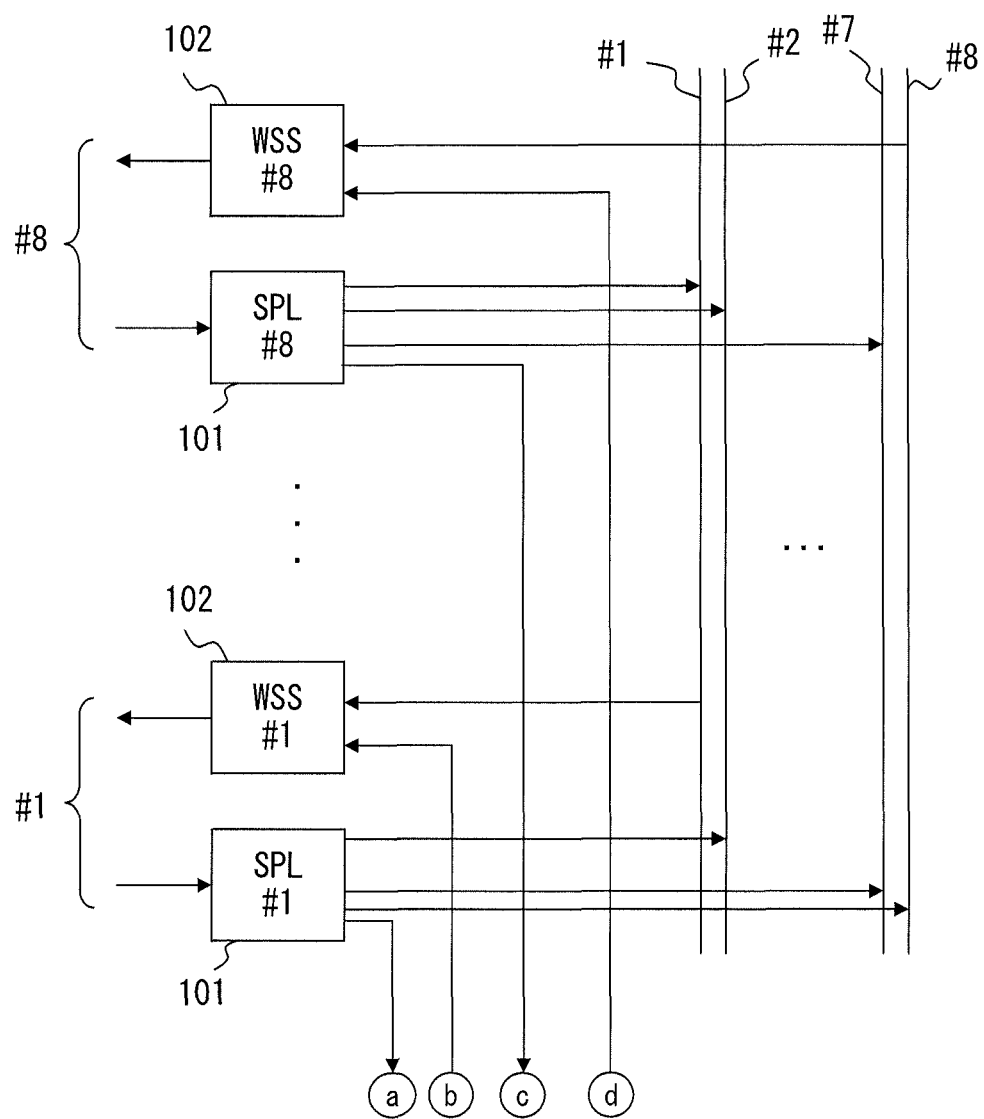
FIG. 25-FIG. 26 are diagrams presenting the first example of an 8-Degree optical add-drop multiplexer.
Figure 26:
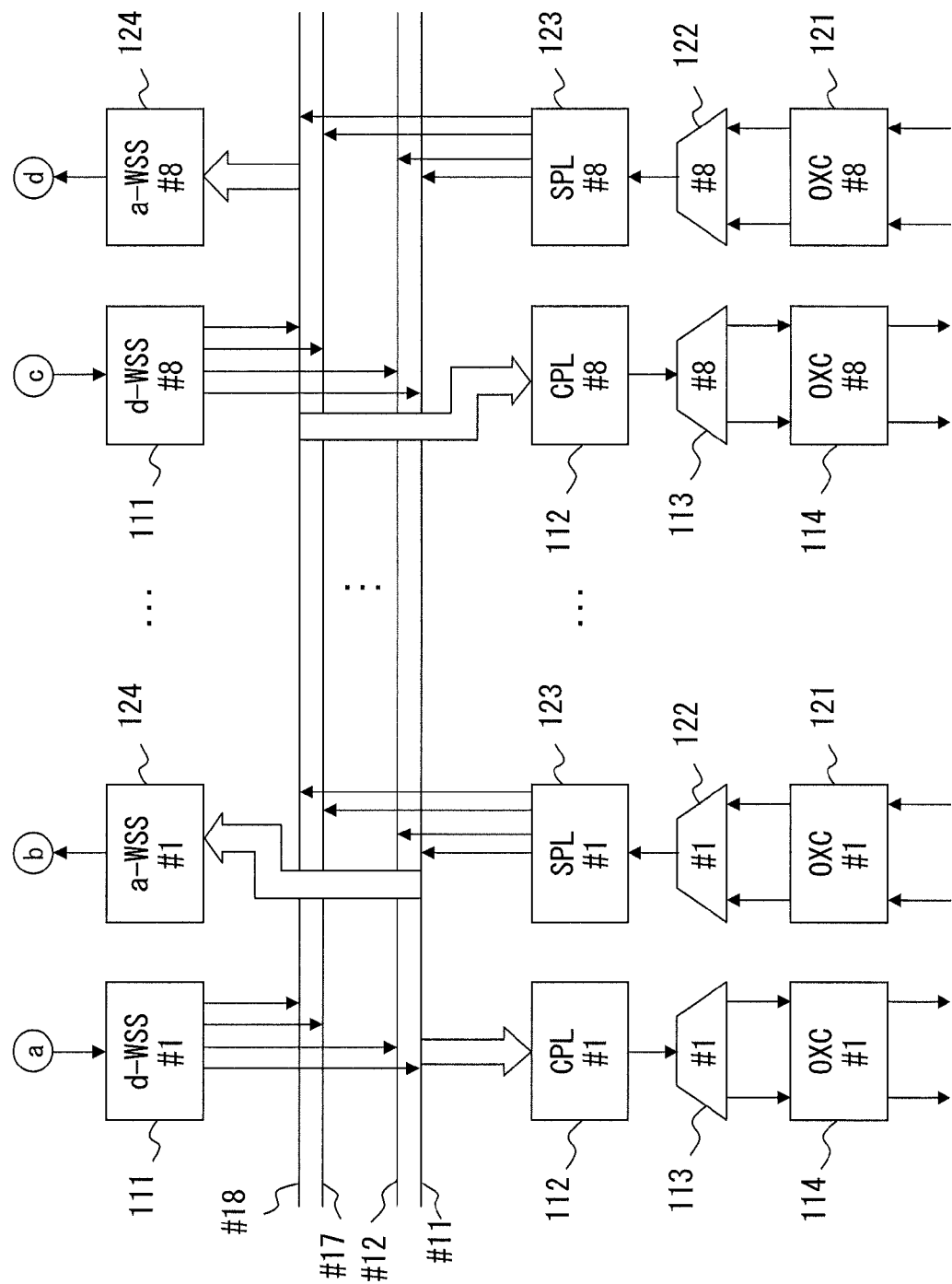

FIG. 25 and FIG. 26 are diagrams presenting the configuration of the first example. In the following description, an optical add-drop multiplexer has eight routes (#1-#8). Each of the routes includes an incoming route and an outgoing route. In FIG. 25, an optical amplifier that amplifies a WDM optical signal input to the optical add-drop multiplexer from corresponding route (Pre-AMP) and an optical amplifier that amplifies a WDM optical signal output to corresponding route from the optical add-drop multiplexer (Post-AMP) are omitted. In addition, other optical amplifiers in the optical add-drop multiplexer are also omitted.

Each optical splitter 101 (#1-#8) splits an input WDM optical signal. The optical splitter 101 is, for example, a 1:8 optical coupler. That is, the optical coupler 101 splits an input WDM optical signal to generate eight WDM optical signals. One of the eight WDM optical signals is guided to a corresponding drop-wavelength switch 111. Other seven WDM optical signals are respectively guided to a wavelength selective switches 102 of other routes. For example, eight WDM optical signals generated by the optical splitter 101#1 are guided to the drop-wavelength switch 111#1 and to wavelength selective switches 102#2-102#8 provided for the routes #2-#8. The optical splitter 101 may also be a 1:9 optical coupler, for example. In this case, an unused split optical signal may be used for another purpose.

Optical paths #1-#8 schematically represent the optical paths between the optical splitters 101#1-101#8 and the wavelength selective switches 102#1-102#8. For example, the optical path #1 represents a function to guide WDM optical signals output respectively from the optical splitters 101#2-101#8 to the wavelength selective switch 102#1.

Each drop-wavelength selective switch 111 (#1-#8) extracts an optical signal of a desired wavelength(s) from a corresponding input WDM optical signal and guides the extracted signal(s) to an optical coupler 112 (#1-#8). Here, the drop-wavelength selective switch 111 has eight or more output ports. In addition, the drop-wavelength selective switch 111 can guide an optical signal of arbitrary wavelength to arbitrary optical coupler 112. For example, the drop-wavelength selective switch 111#1 can guide an optical signal of the wavelength λ1 to the optical coupler 112#1, and can guide an optical signal of the wavelength λ2 and an optical signal of the wavelength λ3 to the optical coupler 112#8.

Optical paths #11-#18 schematically represent the optical paths between the drop-wavelength selective switches 111#1-111#8 and the optical couplers 112#1-112#8. For example, the optical path #11 represents a function to guide optical signals output respectively from the drop-wavelength selective switches 111#1-111#8 to the optical coupler 112#1.

The optical paths #11-#18 also schematically represent the optical paths between optical splitters 123#1-123#8 and add-wavelength selective switches 124#1-124#8. That is, the optical paths #11-#18 schematically represents both the function to transmit an optical signal from the drop-wavelength selective switches 111#1-111#8 to the optical couplers 112#1-112#8, and the function to transmit an optical signal from the optical splitters 123#1-123#8 to the add-wavelength selective switches 124#1-124#8. For example, the optical path #11 represents, in addition to the function described above, a function to transmit optical signals output respectively from the optical splitters 123#1-123#8 to the add-wavelength selective switch 124#1.

Each optical coupler 112 (#1-#8) respectively combines optical signals transmitted from a drop-wavelength selective switch 111 or a plurality of drop-wavelength selective switches 111. That is, the optical add-drop multiplexer can guide optical signals from arbitrary route or all of the routes to a desired optical coupler 112. However, the drop-wavelength selective switch 111 (#1-#8) is controlled by the wavelength path control unit 2 so that optical signals of the same wavelengths are not guided to identical optical coupler 112.

Each wavelength demultiplexer 113 (#1-#8) respectively demultiplexes an optical signal output from a corresponding optical coupler 112 with respect to wavelength. It is assumed that the transmission wavelength of each of the output ports of the wavelength demultiplexer 113 is fixed in advance, as explained with reference to FIG. 8. In addition, when a WDM optical signal in each route carries up to 96 waves (λ1-λ96) for example, the wavelength demultiplexer 113 has 96 output ports. In this case, while this is not a particular limitation, λ1 optical signal may be transmitted from the first optical port, and λ96 optical signal may be transmitted from the 96th port.

Each optical cross connect 114 (#1-#8) respectively guides an optical signal output from a corresponding wavelength demultiplexer 113 to a specified terminal (or, a transponder). In a case in which the wavelength demultiplexer 113 has 96 output ports, the optical cross connect 114 is in the 96×96 configuration. The output signal of the cross connect 114 is transmitted to a terminal through a transponder or an interface that is equivalent to the transponder.

In the configuration described above, in a case of guiding an optical signal of wavelength $\lambda i$ (i=1 through 96) in a WDM optical signal on route #X (X=1 through 8) to a specified accommodated in the optical cross connect 114#1, the drop-wavelength selective switch 111#X is controlled as follows.
(1) Select the wavelength $\lambda i$ from an input WDM optical signal
(2) Guide the optical signal of the selected wavelength $\lambda i$ to the optical coupler 112#1

According to this control, the optical signal of the wavelength $\lambda i$ (hereinafter, an X-$\lambda i$ optical signal) extracted from the WDM optical signal of the route #X is input to the optical coupler 112#1. At this time, an optical signal selected by another drop-wavelength selective switch is also input to the optical coupler 112#1. Therefore, to the wavelength demultiplexer 113#1, a WDM optical signal including the X-$\lambda i$ optical signal is input.

The wavelength demultiplexer 113#1 demultiplexes the WDM optical signal including the X-$\lambda i$ optical signal. As a result, the X-$\lambda i$ optical signal is output from the i-th output port of the wavelength demultiplexer 113#1. Here, the i-th output port of the wavelength demultiplexer 113#1 is optically coupled to the i-th input port of the optical cross connect 114#1. Therefore, the X-$\lambda i$ optical signal is guided to the i-th input port of the optical cross connect 114#1. Then, the optical cross connect 114#1 guides the X-$\lambda i$ optical signal (that is, the optical signal of the wavelength $\lambda i$ extracted from the WDM optical signal of the route #X) to a specified terminal (or, a transponder).

Thus, the optical add-drop multiplexer of the embodiment may transmit an optical signal of a desired wavelength in a WDM optical signal in arbitrary route to a specified terminal. At this time, the wavelength dependency of the wavelength demultiplexer 113 is compensated for by the optical cross connect 114. Therefore, an optical add-drop multiplexer with which the wavelength path can be set up or changed flexibly is realized.

Each optical cross connect 121 (#1-#8) respectively guides an optical signal that is transmitted from a terminal (or, a transponder) to an output port that is determined according to the wavelength of the optical signal. The number of ports of the optical cross connect 121 is the same as that of the optical cross connect 114, for example. In addition, each wavelength multiplexer 122 (#1-#8) multiplexes optical signals that are output from a corresponding cross connect 121. The number of the input ports of the wavelength multiplexer 122 is the same as the number of the output ports of the wavelength demultiplexer 113, for example. In addition, it is assumed that the transmission wavelength of each of the input ports of the wavelength multiplexer 122 is fixed in advance, as explained with reference to FIG. 4.

It is assumed that the transmission wavelengths of the input ports P1-P96 of the wavelength multiplexer 122 are $\lambda 1$-$\lambda 96$, respectively. In addition, it is assumed that the output ports P1-P96 of the optical cross connect 121 are optically coupled to the input ports P1-P96 of the corresponding wavelength multiplexer 122, respectively. In this case, for example, the optical cross connect 121 guides an input optical signal of the wavelength $\lambda 1$ to the output port P1, and guides an input optical signal of the wavelength $\lambda 96$ to the output port P96. Accordingly, even when a terminal (or, a transponder) accommodated in the optical cross connect 121 transmits an optical signal of an arbitrary wavelength, the optical signal is guided to an appropriate input port of the wavelength multiplexer 122.

Each optical splitter 123 (#1-#8) splits an optical signal from a corresponding wavelength multiplexer 122 and guides the signal to add-wavelength selective switches 124#1-124#8. That is, the same optical signal is guided to the add-wavelength selective switches 124#1-124#8.

Each add-wavelength selective switch 124 (#1-#8) respectively selects a desired wavelength or a plurality of desired wavelengths from optical signals guided from the optical splitters 123#1-#8. Then, the add-wavelength selective switch 124 guides the optical signal of the selected wavelength to a corresponding wavelength selective switch 102. For example, the add-wavelength selective switch 124#1 guides an optical signal of the selected wavelength to the wavelength selective switch 102#1. At this time, when a plurality of wavelengths are selected, the add-wavelength selective switch 124 combines the plurality of optical signals and guides the combined signals to a corresponding wavelength selective switch 102.

To each wavelength selective switch 102 (#1-#8), an optical signal guided from a corresponding add-wavelength selective switch 124, and WDM optical signals guided from other routes are input. For example, to the wavelength selective switch 102#1, an optical signal guided from the add-wavelength selective switch 124#1, and WDM optical signals guided from routes #2-#8 are input. Then, the wavelength selective switch 102 selects optical signals to be output to a corresponding route and outputs the selected signals as a WDM optical signal. At this time, the wavelengths of a plurality of optical signals included in the WDM optical signal are selected to be different from each other.

In the configuration described above, it is assumed that an optical signal transmitted from a terminal (or, a transponder) accommodated in the optical cross connect 121#1 using wavelength $\lambda i$ (i=1 through 96) is output to a route #X (X=1 through 8). In this case, the optical signal is guided to the add-wavelength selective switches 124#1-124#8 through the optical cross connect 122#1, the wavelength multiplexer 122#1, and the optical splitter 123#1. At this time, the optical signal is guided to the add-wavelength selective switches 124#1-124#8 together with optical signals transmitted from other terminals.

The add-wavelength selective switch 124#X is controlled so as to select wavelength $\lambda i$. At this time, the add-wavelength selective switch 124#X may select other wavelengths to be output to the route X together. In addition, the wavelength selective switch 102#X is also controlled so as to select the wavelength $\lambda i$. At this time, the wavelength selective switch 102#X may also select other wavelengths to be output to the route X together.

Thus, the optical add-drop multiplexer of the embodiment can output an optical signal of a desired wavelength to a desired route. At this time, the wavelength dependency of the wavelength multiplexer 122 is compensated for by the optical cross connect 121. Therefore, an optical add-drop multiplexer with which the wavelength path can be set up or changed flexibly is realized.

Figure 27:
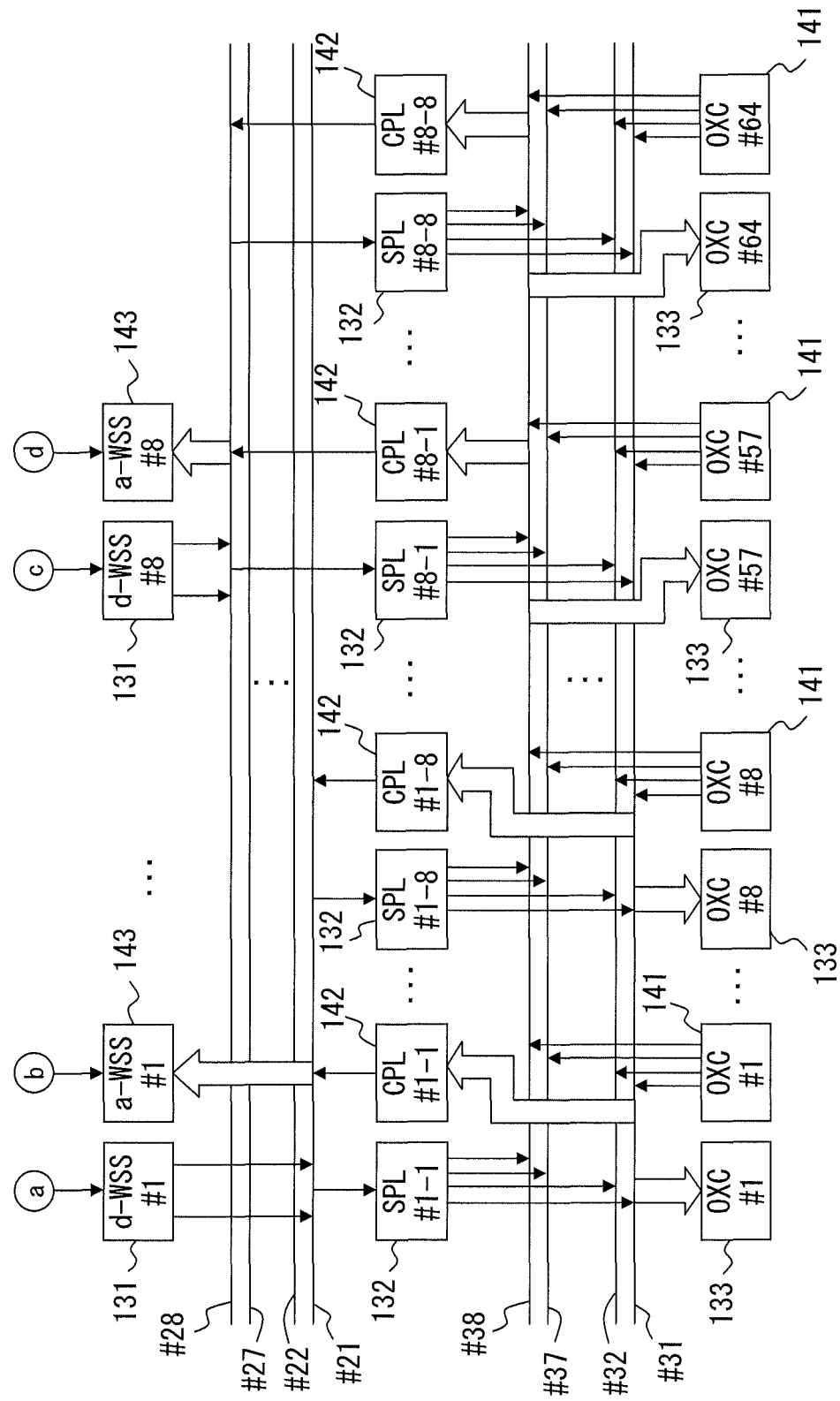
FIG. 27 is a diagram presenting the second example of an 8-Degree optical add-drop multiplexer.

FIG. 27 is a diagram presenting the configuration of the second example. The configuration and operation of the optical splitters 101 (#1-#8) and the wavelength selective switches 102 (#1-#8) are substantially the same as in the first example, as described with reference to FIG. 25.

Each drop-wavelength selective switch 131 (#1-#8) respectively extracts an optical signal of a desired wavelength from a corresponding input WDM optical signal and guides the extracted signal to an optical splitter 132 (#1-1-#1-8). Here, the drop-wavelength selective switch 131 has eight or more output ports. The output ports of the drop-wavelength selective switch 131#i are optically coupled to the optical splitters 132#i-1 through 132#i-8. Therefore, for example, the drop-wavelength selective switch 131#1 extracts an optical signal of a desired wavelength from a WDM optical signal of the route #1 and guides the extracted signal to the corresponding optical splitters 132#1-1 through 132#1-8. At this time, the drop-wavelength selective switch 131 may guide an optical signal of arbitrary wavelength to the corresponding eight optical splitters 132. For example, the drop-wavelength selective switch 131#1 may guide an optical signal of the wavelength λ1 to the optical splitter 132#1-1, and may guide an optical signal of the wavelength λ3 to the optical splitter 132#1-8.

Optical paths #21-#28 schematically represent the optical paths between the drop-wavelength selective switches 131#1-131#8 and the optical splitters 132#1-1 through 132#8-8. For example, the optical path #21 represents a function to guide an optical signal output the drop-wavelength selective switch 131#1 to the optical splitters 132#1-1 through 132#1-8.

In addition, the optical paths #21-#28 also schematically represent the optical paths between optical couplers 142#1-1 through 142#8-8 and add-wavelength selective switches 143#1-143#8. That is, the optical paths #21-#28 schematically represent both the function to transmit an optical signal from the drop-wavelength selective switches 131#1-131#8 to the optical splitters 132#1-1 through 132#8-8, and the function to transmit an optical signal from the optical couplers 142#1-1 through 142#8-8 to the add-wavelength selective switches 143#1-143#8. For example, the optical path #21 represents, in addition to the function described above, a function to guide an optical signal output respectively from the optical couplers 14211-1 through 142#1-8 to the add-wavelength selective switch 143#1.

Each optical splitter 132 (#1-1 through #8-8) splits an optical signal guided from a corresponding output port of a corresponding drop-wavelength selective switch 131, and transmits the split signal to corresponding input ports of optical cross connects 133#1-133#64. For example, the optical splitter 132#1-1 splits an optical signal guided from the output port P1 of the drop-wavelength selective switch 131#1, and guides the split signal to the input port P1 of the optical cross connects 133#1, 133#9, 133#17, 133#25, 133#33, 133#41, 133#49, 133#57. Meanwhile, the optical coupler 132#1-8 splits an optical signal guided from the output port P8 of the drop-wavelength selective switch 131#1, and guides the split signal to the input port P1 of the optical cross connects 133#8, 133#16, 133#24, 133#32, 133#40, 133#48, 133#56, 133#64. Furthermore, the optical coupler 132#8-8 splits an optical signal guided from the output port P8 of the drop-wavelength selective switch 131#8, and guides the split signal to the input port P8 of the optical cross connects 133#8, 133#16, 133#24, 133#32, 133#40, 133#48, 133#56, 133#64.

The optical add-drop multiplexer may be configured to have more optical cross connects 133, 141. For example, 96 sets of optical cross connect 133 and 96 sets of optical cross connect 141 may be provided. In this case, for example, each of the optical splitter 132 has 12 output ports, and each of the optical coupler 142 has 12 input ports.

Optical paths #31-#38 schematically represent the optical paths between the optical splitters 132#1-1 through 132#8-8 and the optical cross connects 133#1-133#64. In addition, the optical paths #31-#38 also schematically represent the optical paths between the optical cross connects 141#1-141#64 and the optical couplers 142#1-1 through 142#8-8. That is, the optical paths #31-#38 schematically represent both the function to transmit an optical signal from the optical splitters 132#1-1 through 132#8-8 to the optical cross connects 133#1-133#64, and the function to transmit an optical signal from the optical cross connects 141#1-141#64 to the optical couplers 142#1-1 through 142#8-8.

Each optical cross connect 133 (#1-#64) guides an optical signal output from the optical splitters 132#1-1 through 132#8-8 to a specified terminal (or, a transponder). For example, the optical cross connect 133#1 performs switching of an optical signal guided from the optical splitters 132#1-1, 132#2-1, 132#3-1, 132#4-1, 132#5-1, 132#6-1, 132#7-1, 132#8-1. Meanwhile, the optical cross connect 133#2 performs switching of an optical signal guided from the optical splitters 132#1-2, 132#2-2, 132#3-2, 132#4-2, 132#5-2, 132#6-2, 132#7-2, 132#8-2. Furthermore, the optical cross connect 133#64 performs switching of an optical signal guided from the optical splitters 132#1-8, 132#2-8, 132#3-8, 132#4-8, 132#5-81, 132#6-8, 132#7-8, 132#8-8.

The optical cross connect 133 is in the 8×8 configuration, and has a tunable filter TF for each output port, as presented in FIG. 18. Each tunable filter TF extracts a wavelength specified by the wavelength path control unit 2. Then, an output signal of the cross connect 133 is transmitted to a terminal through a transponder or an interface that is equivalent to the transponder.

Each optical cross connect 141 (#1-#64) guides an optical signal transmitted from a terminal (or, a transponder) to an output port corresponding to a specified outgoing route to which the optical signal is to be output. For example, an optical signal to be output to the route #1 is guided to the output port P1, and an optical signal output to the route #8 is guided to the output port P8.

The optical cross connect 141 is in the 8×8 configuration, and has a tunable filter TF for each input port, as presented in FIG. 12. The tunable filter TF narrows the spectrum width of an input optical signal from a terminal (or, a transponder).

Each optical coupler 142 (#1-1 through #8-8) combines optical signals guided from corresponding eight optical cross connects 141. For example, the optical coupler 142#1-1 combines optical signals guided from each input port P1 of the optical cross connects 141#1, 141#9, 141#17, 141#25, 141#33, 141#41, 141#49, 141#57.

Each add-wavelength selective switch 143 (#1-#8) selects a desired wavelength or a plurality of wavelengths from optical signals guided from corresponding eight optical couplers 142. For example, the add-wavelength selective switch 143#1 selects an optical signal of a desired wavelength or optical signals of a plurality of desired wavelengths from optical signals guided from the optical couplers 142#1-1 through 142#1-8. The add-wavelength selective switch 143 guides the optical signal of the selected wavelength to a corresponding wavelength selective switch 102. When a plurality of wavelengths are selected, the add-wavelength selective switch 143 combines the plurality of optical signals and guides the signals to a corresponding wavelength selective switch 102.

In the optical add-drop multiplexer configured as described above, in a case of guiding an optical signal Xi of a wavelength λi (i=1 through 96) in a WDM optical signal of a route #X (X=1 through 8) and an optical signal Yi of the same wavelength λi in a WDM optical signal of a route #Y (Y=1 through 8), the drop-wavelength selective switch 131#X is controlled as follows.
(1) Select wavelength λi from an input WDM optical signal
(2) Guide an optical signal of the selected wavelength λi (that is, the optical signal Xi) to the optical splitter 132#X-1 Meanwhile, the drop-wavelength selective switch 131#Y is controlled as follows.
(1) Select wavelength λi from an input WDM optical signal
(2) Guide an optical signal of the selected wavelength λi (that is, the optical signal Yi) to the optical splitter 132#Y-1

According to the control described above, the optical signal Xi is guided from the optical splitter 132#X-1 to a plurality of optical cross connects including the optical cross connect 133#1. Similarly, the optical signal Yi is guided from the optical splitter 132#Y-1 to a plurality of optical cross connects including the optical cross connect 133#1. At this time, the optical signal Xi and the optical signal Yi are guided to input ports PX, PY of the optical cross connect 133#1, respectively. Then, the optical cross connect 133#1 guides the optical signal Xi and the optical signal Yi respectively to specified terminals (or, transponder).

Thus, in the optical add-drop multiplexer of the second example presented in FIG. 25 and FIG. 27, optical signals Xi, Yi extracted from different routes X, Y are guided to different input ports of the optical cross connect 133 through different paths. Therefore, the optical add-drop multiplexer can extract a plurality of optical signals of the same wavelength and transmit the extracted signals respectively to corresponding terminals. That is, in addition to "Colorless" and "Directionless" described above, "Contentionless" is also realized.

In addition, in the configuration described above, it is assumed that an optical signal Ai transmitted from the terminal A (or, a transponder A) using wavelength λi is to be output to a route #X (X=1 through 8), and an optical signal Bi transmitted from the terminal B (or, a transponder B) using the same wavelength λi is to be output to a route #Y (Y=1 through 8). In this example, it is assumed that both of the terminal A and the terminal B are accommodated in the optical cross connect 141#1. In this case, the optical signal Ai is output from the output port PX of the optical cross connect 141#1, and guided to the optical coupler 142#X-1. Meanwhile, the optical signal Bi is output from the output port PY of the optical cross connect 141#1, and guided to the optical coupler 142#Y-1.

The optical coupler 142#X-1 guides the optical signal Ai to the add-wavelength selective switch 143#X together with an optical signal of another wavelength. The add-wavelength selective switch 143#X is controlled to select the wavelength λi. At this time, the add-wavelength selective switch 143#X may select another wavelength to be output to the route X together. In addition, the wavelength selective switch 102#X is also controlled so as to select the wavelength λi. As a result, the optical signal Ai output from the terminal A is added to a WDM optical signal on the route X.

Similarly, the optical coupler 142#Y-1 guides the optical signal Bi to the add-wavelength selective switch 143#Y together with an optical signal of another wavelength. The add-wavelength selective switch 143#Y is controlled to select the wavelength λi. At this time, the add-wavelength selective switch 143#Y may select another wavelength to be output to the route Y together. In addition, the wavelength selective switch 102#Y is also controlled so as to select the wavelength λi. As a result, the optical signal Bi output from the terminal B is added to a WDM optical signal on the route Y.

Thus, in the optical add-drop multiplexer of the second example presented in FIG. 25 and FIG. 27, optical signals Ai, Bi to be output to different routes are output from different ports of the optical cross connect 141, and guided to corresponding routes through different paths. Therefore, the optical add-drop multiplexer can transmit a plurality of optical signals of the same wavelength respectively on desired routes. That is, in addition to "Colorless" and "Directionless" described above, "Contentionless" is also realized.

Figure 28:
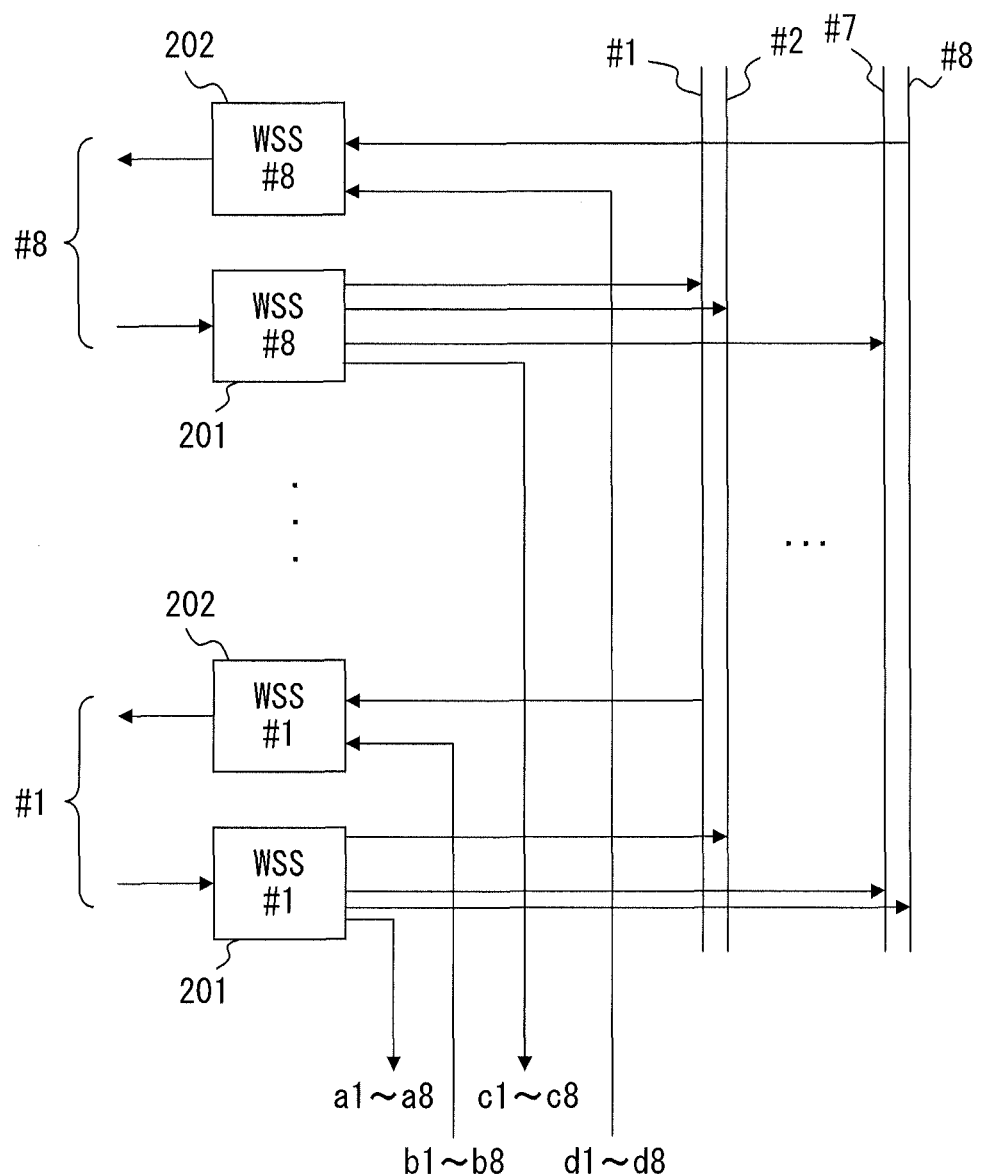
FIG. 28-FIG. 29 are diagrams presenting the third example of an 8-Degree optical add-drop multiplexer.
Figure 29:
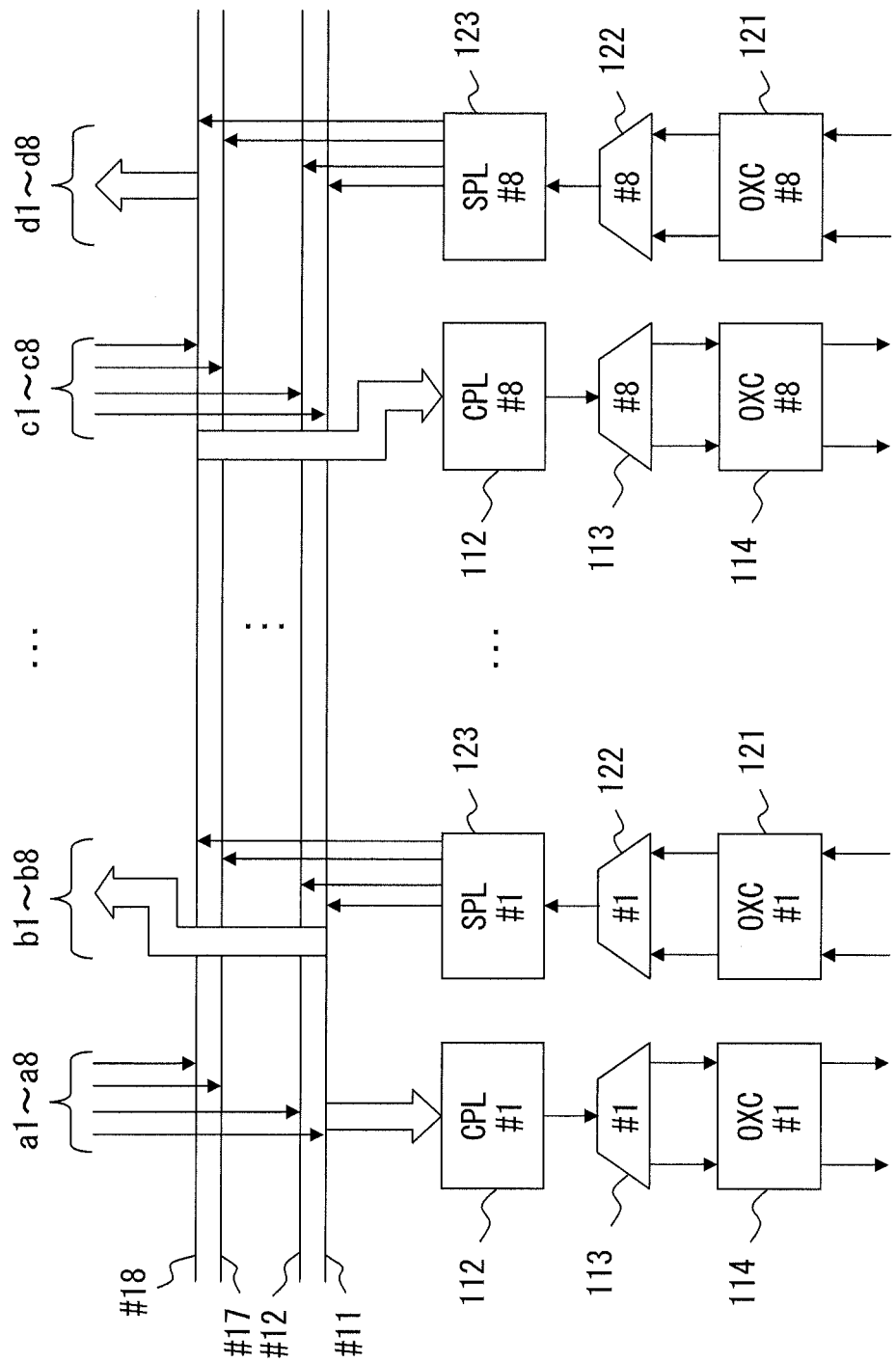

FIG. 28 and FIG. 29 are diagrams presenting the configuration of the third example. The optical add-drop multiplexer of the third example has a similar configuration to that in the first example. However, in the third example, a wavelength selective switch 201 and a wavelength selective switch 202 are used instead of the optical splitter 101 and the wavelength selective switch 102 provided in the first example.

The wavelength selective switch 201 has 15 or more output ports. Optical signals that are output from seven ports are guided respectively to other routes. At this time, the wavelength selective switch 201 may select all the wavelengths of an input WDM optical signal and guide them to other routes. Meanwhile, optical signals that are output from other eight ports are guided to optical couplers 112#1-112#8, respectively. At this time, the wavelength selective switch 201 may select only a wavelength of an optical signal required by a terminal.

The wavelength selective switch 202 has 15 or more input ports. To seven input ports, WDM optical signals input from other routes are guided respectively. Meanwhile, to other eight input ports, optical signals that are output respectively from the optical splitters 123#1-123#8 are guided.

According to this configuration, compared with the first example presented in FIG. 25-26, the optical add-drop multiplexer of the third example does not need to have the drop-wavelength selective switches 111#1-111#8, and the add-wavelength selective switches 124#1-124#8. In addition, the optical add-drop multiplexer can have more routes by increasing the number of ports of the wavelength selective switch 201, 202.

FIG. 30 is a diagram presenting the configuration of the fourth example. The optical add-drop multiplexer of the fourth example has a similar configuration as that in the second example. The wavelength selective switch 201 and the wavelength selective switch 202 are substantially the same as in the third example, as presented in FIG. 28.

In the fourth example, optical signals output from seven output ports of the wavelength selective switch 201 are respectively guided to other routes, and output signals output from the other eight output ports are guided to the corresponding eight optical splitters 132#1-1 through 132#8-8. In addition, to seven input ports of the wavelength selective switch 202, WDM optical signals of other routes are guided respectively, and to the other eight input ports, output optical signals from the corresponding optical couplers 142#1-1 through 142#8-8 are guided respectively. Thus, in the fourth example, the optical add-drop multiplexer does not need to have the drop-wavelength selective switches 131#1-131#8, and the add-wavelength selective switches 142#1-142#8.

Deployment of Optical Amplifier

In the optical add-drop multiplexer of the embodiment, loss occurs in the optical devices (the wavelength selective switch, optical cross connect, optical coupler, optical splitter, tunable filter, MUX/DMUX, and so on). Due to the loss, for example, the optical signal-to-noise ratio at a receiver deteriorate, and the transmission quality deteriorate. Therefore, depending on the configuration of the optical add-drop multiplexer, it is preferable to deploy an optical amplifier in the optical add-drop multiplexer, in addition to optical amplifiers for transmission paths. Optical amplifiers for transmission paths correspond to the optical amplifiers 11E, 11W in FIG. 2 for example, and operate as a preamplifier to amplify a received WDM optical signal and a post amplifier to amplify a transmission WDM optical signal. Hereinafter, an optical amplifier (loss compensation optical amplifier) disposed in addition to the optical amplifiers for transmission paths is discussed.

Generally, an optical amplifier is deployed in consideration of the following factors.

(1) power constraints
(2) gain range

The total power of an optical amplifier is +19 dBm or below for a standard product, and +22 dBm or below for a high-end, for example. The gain of an optical amplifier is 30 dB or below for a standard product, and 35 dB or below for a high-end, for example. The optical signal-to-noise ratio in an optical node is calculated based on the gain of the optical amplifier and NF (Noise Figure).

In order to satisfy the constraints of the nonlinear effect of the optical transmission path, it is preferable that the output optical power of the optical node (that is, the optical power at the input end of the transmission path optical fiber) is designed based on the bit rate of the signal, the number of spans of the network system, and so on. As an example, the output optical power of the optical node is set to about +2.0 dBm.

In the optical add-drop multiplexer presented in FIG. 25, FIG. 26, optical amplifiers are disposed as follows as pattern 1. That is, an optical amplifier to amplify a drop signal is disposed between the optical coupler 112 and the wavelength demultiplexer 113. An optical amplifier to amplify an add signal is disposed between the wavelength multiplexer 122 and the optical splitter 123. Meanwhile, optical amplifiers are disposed as follows as pattern 2. That is, an optical amplifier to amplify the drop signal is disposed between the optical splitter 101 and the drop-wavelength selective switch 111. An optical amplifier to amplify the add signal is disposed between the add-wavelength selective switch 124 and the wavelength selective switch 102.

In the optical add-drop multiplexer presented in FIG. 25, FIG. 27, optical amplifiers are disposed as follows as pattern 1. That is, an optical amplifier to amplify the drop signal is disposed between the drop-wavelength selective switch 131 and the optical splitter 132. An optical amplifier to amplify the add signal is disposed between the optical coupler 142 and the add-wavelength selective switch 143. Meanwhile, optical amplifiers are disposed as follows as pattern 2. That is, an optical amplifier to amplify the drop signal is disposed between the optical splitter 101 and the drop-wavelength selective switch 131. An optical amplifier to amplify the add signal is disposed between the add-wavelength selective switch 143 and the wavelength selective switch 102.

In either case, it is preferable that the loss compensation optical amplifier is disposed in consideration of the factors described above. However, depending on the configuration of the optical add-drop multiplexer, it may be preferable not to deploy the loss compensation optical amplifier. In addition, the disposition of the loss compensation optical amplifier and whether or not to deploy the loss compensation optical amplifier may be designed in consideration of costs of the optical add-drop multiplexer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. An optical add-drop multiplexer having first and second routes, comprising:
    an optical cross connect;
    a first wavelength selective switch optically coupled to a plurality of output ports of the optical cross connect and configured to select specified optical signals;
    a second wavelength selective switch optically coupled to a plurality of other output ports of the optical cross connect and configured to select specified optical signals;
    a third wavelength selective switch to generate a first WDM optical signal including at least one of the optical signals output from the first wavelength selective switch and to guide the first WDM optical signal to the first route; and
    a fourth wavelength selective switch to generate a second WDM optical signal including at least one of the optical signal output from the second wavelength selective switch and to guide the second WDM optical signal to the second route,
    wherein the optical cross connect guides an input optical signal to the first wavelength selective switch when the input optical signal is output on the first route, and guides an input optical signal to the second wavelength selective switch when the input optical signal is output on the second route,
    wherein the first wavelength selective switch has an output optically connected to an input of the third wavelength selective switch, and wherein the third wavelength selective switch is not optically connected to the second wavelength selective switch, and
    wherein the second wavelength selective switch has an output optically connected to an input of the fourth wavelength selective switch, and wherein the fourth wavelength selective switch is not optically connected to the first wavelength selective switch.

2. The optical add-drop multiplexer according to claim 1, further comprising a first optical coupler between the optical cross connect and the first wavelength selective switch, and a second optical coupler between the optical cross connect and the second wavelength selective switch.

3. The optical add-drop multiplexer according to claim 1, further comprising a plurality of optical filters respectively having a specified transmission wavelength, for a plurality of input ports of the optical cross connect.

4. The optical add-drop multiplexer according to claim 2, wherein
    an optical coupler to combine a plurality of optical signals guided from a plurality of input ports of the optical cross connect is provided for each output port of the optical cross connect.

5. The optical add-drop multiplexer according to claim 1, wherein
    the first and second multiplexers respectively have a wavelength multiplexer;
    different transmission wavelengths are set for a plurality of input ports of the wavelength multiplexer; and
    the optical cross connect guides an input optical signal of the optical cross connect to a corresponding input port of the wavelength multiplexer according to a wavelength of the input optical signal.

6. An optical add-drop multiplexer comprising:
    a plurality of optical cross connects;
    a drop signal generator to generate a first drop optical signal from an input WDM optical signal;

a wavelength selective switch to generate a second drop optical signal from the first drop optical signal; and
an optical splitter to split the second drop optical signal to be guided to the plurality of optical cross connects; wherein
at least one of the optical cross connects guides the second drop optical signal received at an input port to a plurality of output ports.

7. The optical add-drop multiplexer according to claim 6, wherein
the drop signal generator splits the input WDM optical signal and outputs the split signal as the drop optical signal.

8. An optical add method used in an optical add-drop multiplexer having first and second routes, comprising:
wave length selectively switching a plurality of optical signals output from a plurality of output ports of an optical cross connect to generate a first specified optical signal;
wave length selectively switching a plurality of optical signals output from a plurality of other output ports of the optical cross connect to generate a second specified optical signal;
generating a first WDM optical signal including an optical signal in the first specified optical signal and guiding the first WDM optical signal to the first route; and
generating a second WDM optical signal including an optical signal in the second specified optical signal and guiding the second WDM optical signal to the second route,
wherein the optical cross connect guides an input optical signal to a first wavelength selective switch when the input optical signal is output on the first route, and guides an input optical signal to a second wavelength selective switch when the input optical signal is output on the second route,
wherein the first wavelength selective switch has an output optically connected to an input of a third wavelength selective switch, and wherein the third wavelength selective switch is not optically connected to the second wavelength selective switch, and
wherein the second wavelength selective switch has an output optically connected to an input of a fourth wavelength selective switch, and wherein the fourth wavelength selective switch is not optically connected to the first wavelength selective switch.

9. An optical drop method used in an optical add-drop multiplexer with a plurality of optical cross connects, comprising:
generating a first drop optical signal from an input WDM optical signal;
wave length selectively generating a second drop optical signal from the first drop optical signal; and
optically splitting the second drop optical signal to be guided to the plurality of optical cross connects; wherein
at least one of the optical cross connects guides the second drop optical signal received at an input port to a plurality of output ports.

10. An optical add-drop multiplexer having first and second routes, comprising:
a first optical cross connect;
a first wavelength selective switch optically coupled to a plurality of output ports of the first optical cross connect;
a second wavelength selective switch optically coupled to a plurality of other output ports of the first optical cross connect;
a third wavelength selective switch to generate a first WDM optical signal including an optical signal output from the first wavelength selective switch and to guide the first WDM optical signal to the first route;
a fourth wavelength selective switch to generate a second WDM optical signal including an optical signal output from the second wavelength selective switch and to guide the second WDM optical signal to the second route;
a second optical cross connect;
a drop signal generator to generate a first drop optical signal from an input WDM optical signal from the first route or the second route;
a fifth wavelength selective switch to generate a second drop optical signal including a plurality of optical signals from the first drop optical signal and to guide the second drop optical signal to a plurality of input ports of the second optical cross connect; and
a plurality of optical filters to extract a respectively specified wavelength from each second drop optical signal output from the second optical cross connect,
wherein the optical cross connect guides an input optical signal to the first wavelength selective switch when the input optical signal is output on the first route, and guides an input optical signal to the second wavelength selective switch when the input optical signal is output on the second route,
wherein the first wavelength selective switch has an output optically connected to an input of the third wavelength selective switch, and wherein the third wavelength selective switch is not optically connected to the second wavelength selective switch, and
wherein the second wavelength selective switch has an output optically connected to an input of the fourth wavelength selective switch, and wherein the fourth wavelength selective switch is not optically connected to the first wavelength selective switch.

11. A WDM network system having a plurality of optical add-drop multiplexers, wherein
each optical add-drop multiplexer has first and second routes; and
each optical add-drop multiplexer comprises:
a first optical cross connect;
a first wavelength selective switch optically coupled to a plurality of output ports of the first optical cross connect;
a second wavelength selective switch optically coupled to a plurality of other output ports of the first optical cross connect;
a third wavelength selective switch to generate a first WDM optical signal including an optical signal output from the first wavelength selective switch and to guide the first WDM optical signal to the first route;
a fourth wavelength selective switch to generate a second WDM optical signal including an optical signal output from the second wavelength selective switch and to guide the second WDM optical signal to the second route;
a second optical cross connect;
a drop signal generator to generate a first drop optical signal from an input WDM optical signal from the first route or the second route;
a fifth wavelength selective switch to generate a second drop optical signal including a plurality of optical signals from the first drop optical signal and to guide the second drop optical signal to a plurality of input ports of the second optical cross connect; and a plurality of optical filters to extract a respectively specified wavelength from each second drop optical signal output from the second optical cross connect, wherein the optical cross connect guides an input optical signal to the first wavelength selective switch when the input optical signal is output on the first route, and guides an input optical signal to the second wavelength selective switch when the input optical signal is output on the second route, wherein the first wavelength selective switch has an output optically connected to an input of the third wavelength selective switch, and wherein the third wavelength selective switch is not optically connected to the second wavelength selective switch, and wherein the second wavelength selective switch has an output optically connected to an input of the fourth wavelength selective switch, and wherein the fourth wavelength selective switch is not optically connected to the first wavelength selective switch.

12. The optical add-drop multiplexer according to claim 1, wherein the first wavelength selective switch has a plurality of input ports and only one output port, the second wavelength selective switch has a plurality of input ports and only one output port.

13. The optical add-drop multiplexer according to claim 12, wherein the first wavelength selective switch combines a plurality of optical signals of different wavelengths input via different input ports and outputs the combined optical signals via the output port, the third wavelength selective switch combines a plurality of optical signals of different wavelengths input via different input ports and outputs the combined optical signals via the output port.

14. The optical add-drop multiplexer according to claim 6, wherein each of the optical cross connects includes:

a plurality of splitters implemented for respective input ports; and a plurality of switches implemented for respective output ports, each of the splitters splits an input optical signal to be guided to the plurality of switches, and each of the switches receives a plurality of optical signals from the plurality of splitters and selects specified one of the plurality of optical signals.

* * * * *